US007552150B2

(12) United States Patent
Olson-Williams

(10) Patent No.: US 7,552,150 B2

(45) Date of Patent: Jun. 23, 2009

(54) REASON-BASED DATABASE CHANGES

(75) Inventor: Lonny Olson-Williams, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 280 days.

(21) Appl. No.: 11/272,581

(22) Filed: Nov. 10, 2005

(65) Prior Publication Data

US 2007/0112866 A1 May 17, 2007

(51) Int. Cl.
*G06F 17/30* (2006.01)
*G06F 17/00* (2006.01)

(52) U.S. Cl. ....................... 707/203; 707/200; 707/202; 707/204

(58) Field of Classification Search ................ 707/200, 707/202, 203, 204
See application file for complete search history.

(56) References Cited

U.S. PATENT DOCUMENTS 5,553,279 A * 9/1996 Goldring .................... 707/201
6,081,799 A * 6/2000 Beavin et al. .................. 707/2
6,189,016 B1 * 2/2001 Cabrera et al. .............. 707/203
6,839,724 B2 * 1/2005 Manchanda et al. ......... 707/203
6,981,114 B1 * 12/2005 Wu et al. .................... 711/162
7,251,669 B1 * 7/2007 Arora ......................... 707/202
2006/0212492 A1 * 9/2006 Jacobs et al. ................ 707/202

* cited by examiner

*Primary Examiner*—Tony Mahmoudi
*Assistant Examiner*—Nicholas F. Woronko
(74) *Attorney, Agent, or Firm*—Owen J. Gamon

(57) ABSTRACT

A method, apparatus, system, and signal-bearing medium that in an embodiment, store a reason identifier in rows in a database. The reason identifier identifies the most recent change to the rows. The content of the rows that existed prior to the change are stored in journal records. In response to an undo command, the most-recent instance of each record identifier in the records associated with the reason identifier are found in the journal and moved to the database in reverse time sequence order. In an embodiment, a promote operation requests moving the change upwards in a sequence, from a source version to a target version of the database. In response to the promote operation, a determination is made whether rows with the same row identifiers but a different reason identifier exist in a target version of the database, but the different reason identifier is complete.

6 Claims, 18 Drawing Sheets

DATA 3 | REASON C | ACTION
INSERT
SOURCE 152-1 DATABASE
DATA 2 | REASON B
ACTION
PROMOTE
DEMOTE
TARGET 152-2 DATABASE
DATA 1 | REASON A
ACTION
RESTORE
156-1 JOURNAL
RESTORE
156-2 JOURNAL
DEPENDENT APP A 153-1
DEPENDENT APP B 153-2
DEPENDENT APP A 153-1
DEPENDENT APP B 153-2
DEPENDENT APP C 153-3
REASON APP 134
DEPENDENT APP C 153-3

| REASON DATA | | | |
|---|---|---|---|
| REASON ID | STATUS | MOVE | COMMENTS |
| REASON A | TARGET | N | SMITH AIRLINE BOOKING |
| REASON B | SOURCE | N | SMITH HOTEL BOOKING |
| REASON C | OPEN | N | SMITH AUTOMOBILE BOOKING |
| | | | 154 |

| ACTION | ROW ID | DATA | REASON ID | IGNORE | TIMESTAMP |
|---|---|---|---|---|---|
| | | | | | |
| | | | | | |

FIG. 3

| REASON ID | STATUS | MOVE | COMMENTS |
|---|---|---|---|
| REASON A | CLOSED | N | SMITH AIRLINE BOOKING |
| REASON B | OPEN | Y | SMITH HOTEL BOOKING |

| SEQUENCE | LOCK | VERSION |
|---|---|---|
| 1 | Y | OPEN |
| 2 | N | CLOSED |

REASON DATA

| REASON ID | STATUS | MOVE | COMMENTS |
|---|---|---|---|
| REASON A | TARGET | N | SMITH AIRLINE BOOKING |
| REASON B | SOURCE | N | SMITH HOTEL BOOKING |
| REASON C | OPEN | N | SMITH AUTOMOBILE BOOKING |

154

| SEQUENCE | LOCK | VERSION |
|---|---|---|
| 1 | Y | OPEN |
| 2 | Y | SOURCE |
| 1 | N | TARGET |
| 2 | N | CLOSED |

REASON-BASED DATABASE CHANGES

FIELD

An embodiment of the invention generally relates to computers. In particular, an embodiment of the invention generally relates to reason-based changes to databases.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware (such as semiconductors, integrated circuits, programmable logic devices, programmable gate arrays, and circuit boards) and software, also known as computer programs. Computer systems also typically include digital storage devices, which store the software, such as an operating system and applications, and data.

One mechanism for managing the data is called a database management system (DBMS), which may also be called a database system or simply a database. Many different types of databases are known, but the most common is usually called a relational database (RDB), which organizes data in tables that have rows, which represent individual entries or records in the database, and columns, which define what is stored in each entry or record. Each table has a unique name within the database and each column has a unique name within the particular table. Specific columns within each table can be defined as key columns. Each unique combination of values in the aggregate of the key columns in a particular data row uniquely identifies that data row in the database. If two or more rows of data are entered such that the key columns contain the same values, then only the last data row entered remains in the database. The database also has an index, which is a data structure that informs the database management system of the location of a certain row in a table given an indexed column value, analogous to a book index informing the reader on which page a given word appears.

As an aid to maintaining integrity of databases, a component often known as a journal file system keeps a current record, or journal (also known as a journal receiver or change log), of changes to the data. In general, a journal file system provides three primary areas of support: (1) recording changes to data objects, (2) single system recovery, and (3) recovery of a saved data object to a known state. These areas are discussed below.

In a recording of changes to data objects, object changes are recorded as journal entries in a journal receiver. The journal receiver is a file object that contains journal entries added by the journal system when data objects are modified. The journal entries may then be used for recovery from an abnormal system termination. Another use for the recorded changes is for replicating entries from the journal receiver to a back-up system so that they can be retrieved to create and maintain a replica of the source file system.

The journal can be used to recover the database to a known state following an abnormal system termination. The recovery process often occurs during an IPL (Initial Program Load) following the abnormal system termination. The journal receiver serves as a basis for all changes to objects that are implemented by an IPL. The IPL then processes object changes as if the abnormal system termination had not occurred by using the data contained in the journal receiver log that was created before the system termination. Damaged objects, caused by system functions that were interrupted during their critical operations, are discarded.

When recovering a saved object to a known state, the object is recovered (or rolled back) to a state of its last saved operation occurring sometime prior to the operation that caused the object to become corrupted or enter an invalid or incorrect state. Then, objects are recovered to some later point in time by applying the journaled changes that were recorded in the journal receiver.

Although the aforementioned journal file system techniques have worked well for conventional data, new applications are being developed that imbed complex logic within data, which yields a complex data structure. The data and logic are often so complex that a given operation may complete and satisfy the integrity rules of the database, yet some aspect of the complex data structure is still incorrect or in an invalid state. Typically, an invalid state involves multiple operations that could be scattered throughout the database. Individually, each operation might be correct, but taken collectively, the operations produce an incorrect result or invalid state of the data. When this happens, rolling back the invalid group of operations is necessary.

Unfortunately, the incorrect result is usually not detected immediately, so that additional database operations will usually occur after the incorrect data is entered to the database, but before the problem is detected. Using current time-based journaling and rollback implementations, the newer updates, which although they may be correct, still need to be removed in order to restore the database to a correct state prior to the error. Then, the valid input must be determined and reentered. In addition to the problem of the redo effort, the result can be a confusing situation where completed and validated activities are undone and must be redone. This confusing situation creates new opportunities for error and may force retesting of previously validated data content and may require coordinating across what can often be different data entry and validation teams. With recent advancements in data propagation, these problems are further complicated when the erroneous data has been propagated to multiple downstream databases. By the time the problem is detected many databases can be impacted.

Thus, a better technique is needed for handling changes to databases.

SUMMARY

A method, apparatus, system, and signal-bearing medium are provided that, in an embodiment, store a reason identifier in rows in a database. The reason identifier identifies the most recent change to the rows. The content of the rows that existed prior to the change are stored in journal records. In response to an undo command, the most-recent instance of each record identifier in the records associated with the reason identifier are found in the journal and moved to the database in reverse time sequence order.

In an embodiment, a promote operation requests moving the change upwards in a sequence, from a source version to a target version of the database. In response to the promote operation, a determination is made whether rows with the same row identifiers but a different reason identifier exist in a target version of the database, but the different reason identifier is complete. A reason identifier is complete if a most-recent version of the database to accept a change associated with the reason identifier is higher in a sequence than the target database version. If the determination is false, the different reason identifiers are linked, and a future command that specifies one reason identifier is also performed against the other reason identifier. The rows are copied from the source version to the target version.

In an embodiment, in response to a demote operation of a reason identifier from a target version to a source version of the database, a determination is made whether rows with the same row identifiers but a different reason identifier exist in the source version. If the determination is true, the different reason identifiers are linked, and a future command that specifies one reason identifier is also performed against the other reason identifier. The most-recent records in the journal that are associated with the reason identifier are found and the contents of the records are moved to the target version of the database in reverse time sequence order.

BRIEF DESCRIPTION OF THE DRAWING

FIG. 3 depicts a block diagram of an example journal, according to an embodiment of the invention.

DETAILED DESCRIPTION

Figure 1:
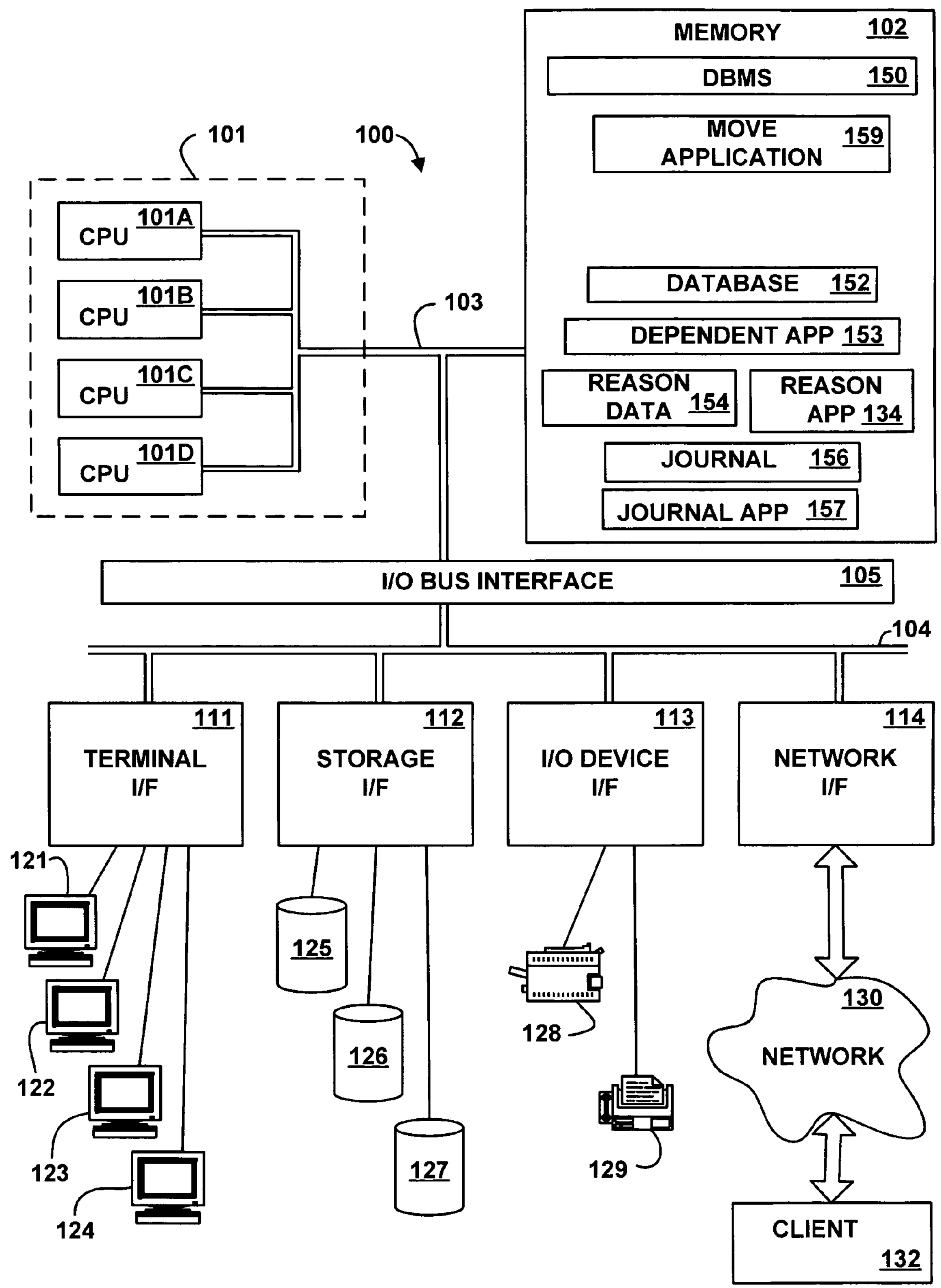
FIG. 1 depicts a block diagram of an example system for implementing an embodiment of the invention.

In an embodiment, rows in a database and records in a journal include reason identifiers, and the user who performs data entry and data modifications may enter a reason identifier that explains, documents, or describes the change to the database. Multiple rows in the database and multiple records in the journal may include the same reason identifier that describes related changes.

The reason identifier is used to selectively undo changes related to the reason identifier. When an undo of a reason identifier is initiated, the most recent instance of previously saved data for the same records in the journal are applied to the database in reverse time sequence to ensure the same integrity sequence as when the data was entered.

In addition, the reason identifier is used to selectively promote any changes to the rows between source and target versions of the database. The terms "source" and "target" are used for convenience only, and a version that is a source version in one embodiment may be a target version in another embodiment, and vice versa. Each insert and promote operation searches the row identifiers for each affected row in the target database version to determine if the same row was previously modified by a different reason identifier that is not complete, which indicates a collision. A reason identifier is complete in a current database version if the most recent or highest database version to accept changes associated with the reason identifier is higher in a sequence of versions than the current database version into which the operation is currently copying or moving changes associated with the reason identifier.

When a collision occurs on an insert or promote operation, in an embodiment, the user is given the opportunity to decide whether to proceed with the insert or promote operation. If the user chooses to proceed then:

a. any newer update into the target version of the database takes precedence, and any previous delete is overwritten (and journaled) in the target version of the database;

b. any newer delete into the target version of the database takes precedence, and any previous update is overwritten (and journaled) in the target version of the database;

c. any newer update into the target database takes precedence, and any previous update is overwritten (and journaled) in the target database;

d. if a collision is detected and the operation is allowed to complete, then the colliding reasons are linked together and function as a single reason identifier in future operations; and e. optionally, a lock operation may be employed to halt data promotions that produce collisions.

In addition, the reason identifier is used to selectively demote changes from a target version to a source version of a database. The demote performs a combination of:

a. The demote operation links the reason identifier with any colliding reason identifiers depending on the corresponding rows in the source version of the database. The demote operation searches the row identifiers for each affected row in the source version of the database to determine if the same row has been modified by a newer reason identifier, which also indicates a collision. When demoting a delete change action, the collision may be with a newer update in the source version that recreates the same data row, in which case, the newer update takes precedence, and the delete is ignored in the source version. Similarly, demoting an update may collide with a newer delete, in which case, the delete takes precedence, and the demoted update is ignored in the source version. Similarly, demoting an update may collide with a newer update in the source version, in which case the newer update into the source version takes precedence. If a collision is detected and the demote operation is allowed to continue, the colliding reasons are linked together and function as a single reason identifier in future operations.

b. The demote operations performs an undo of the reason identifier's changes to the target database. In response to an undo command, the most recent instance of each record identifier in the target database records associated with the reason identifiers are found in the target journal and moved to the target database in reverse time sequence order.

c. The demote operation sets the reason identifier status corresponding to a decremented value in a sequence of versions of the database.

An accommodation is also described for collision handling that allows fixes in multiple database versions simultaneously.

Referring to the Drawings, wherein like numbers denote like parts throughout the several views, FIG. 1 depicts a high-level block diagram representation of a computer system 100 connected to a client 132 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a reason application 134, a database management system (DBMS) 150, a database 152, a dependent application 153, reason data 154, a journal 156, a journal application 157, and a move application 159. In various embodiments, any or all of the reason application 134, the database 152, the dependent application 153, the reason data 154, the journal 156, the journal application 157, and the move application 159 may be included in the database management system 150 or implemented separately to interact with the database management system 150. Although the reason application 134, the database management system 150, the database 152, the dependent application 153, the reason data 154, the journal 156, the journal application 157, and the move application 159 are illustrated as being contained within the memory 102 in the computer system 100, in other embodiments some or all of them may be on different computer systems, and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the reason application 134, the database management system 150, the database 152, the dependent application 153, the reason data 154, the journal 156, the journal application 157, and the move application 159 are all illustrated as being contained within the memory 102, these elements are not necessarily all completely contained in the same storage device at the same time.

The reason application 134 creates and closes reasons via the reason data 154. The reason application 134 further sends requests to the database management system 150 and the move application 159 to make additions, updates, deletions, promotions, and/or demotions (referred to herein collectively as changes) to the database 152. The reason application 134 also displays the status of reasons and marks reasons (via the move field 440) for promotion or demotion in the reason data 154. The reason application 134 also updates comments associated with the reason.

The move application 159 promotes (propagates or adds) and demotes (removes) changes between versions of the database 152. The move application 159 also handles insert and close operations, which are special cases of the promote operation. The insert operation promotes data, not from a database 152, but from user-supplied input to the target database 152. The close operation promotes data from the last version of the database 152 and marks the data change as closed (via the status field 430). In addition, the move application 159 performs the remove operation, which is a special case of the demote operation. The remove operation demotes data changes from the first database version, which removes the data changes from appearing in any database version.

The database management system 150 performs add, update, and delete operations against the database 152 and saves and restores the database 152 or any portion thereof to secondary storage. In an embodiment, the database management system 150 manages data in ways that may be powerful and flexible, yet complex. This complexity may be masked from the user via a graphical user interface, e.g., at the client 132, while the database management system 150 executes in the background. Thus, a reference to a user or user input refers to a database application at the client 132 receiving input from a user and sending the input to the reason application 134.

The database management system 150 saves a log of changes that the client 132 initiates to the database 152 so the journal application 157 may preserve the previous states of the database 152. The database management system 150 also may request the journal application 157 to apply the changes from the journal 156 back to the database 152, for example after a restore of the database 152. The journal 156 is further described below with reference to FIG. 3.

In an embodiment, the move application 159 includes instructions capable of executing on the processor 101 or statements capable of being interpreted by instructions executing on the processor 101 to perform the functions as further described below with reference to FIGS. 10A, 10B, 11, 12, 13, 14, 15, 16, and 17. In another embodiment, the move application 159 may be implemented in microcode. In yet another embodiment, the move application 159 may be implemented in hardware via logic gates and/or other appropriate hardware techniques, in lieu of or in addition to a processor-based system.

The database 152 may include any data that is capable of being changed, saved, and restored. In various embodiments, the database 152 may be a file, directory, container, relational database, document, table, registry, web page, schema, framework, any portion thereof, or any other appropriate type of data. The database 152 is further described below with reference to FIG. 2. The reason data 154 describes reasons for the changes to the database 152 and is further described below with reference to FIG. 4.

The data dependent applications 153 are applications that rely on the contents of the database 152, either by reading the database 152 directly or by copying data from the database 152 into databases local to each data dependent application 153.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be loaded from and stored to the memory 102 as needed. The storage interface unit 112 may also support other types of devices, such as a tape device, an optical device, or any other type of storage device.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, and parallel and redundant paths. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The client 132 may include some or all of the hardware and/or software elements previously described above for the computer system 100. In various embodiments, the client 132 may be a database management system, an editor, an online order management system, an accounting system, or any other appropriate type of application. Although the client 132 is illustrated as being separate from the computer system 100, in another embodiment the client 132 may be a part of the computer system 100.

It should be understood that FIG. 1 is intended to depict the representative major components of the computer system 100, the network 130, and the client 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media, which include, but are not limited to:

(1) information permanently stored on a non-rewriteable storage medium, e.g., a read-only memory storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, the memory 102, or diskette; or (3) information conveyed to the computer system 100 by a communications medium, such as through a computer or a telephone network, e.g., the network 130, including wireless communications.

Such tangible signal-bearing media, when carrying or encoding machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
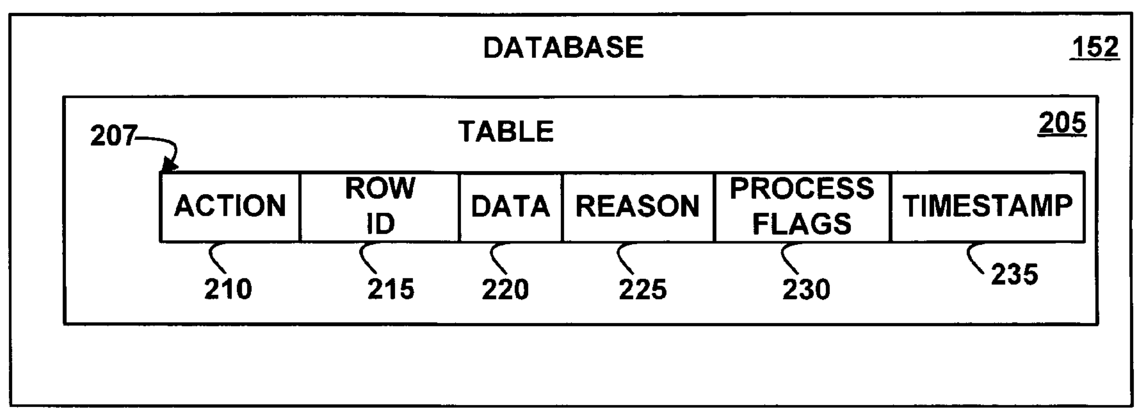
FIG. 2 depicts a block diagram of an example database, according to an embodiment of the invention.

FIG. 2 depicts a block diagram of an example database 152, according to an embodiment of the invention. The example database 152 includes any number of tables 205, each with any number of records or data rows 207. Each row 207 includes an action field 210, a set of one or more row identifier fields or key fields 215, a set of one or more data fields 220, a reason identifier field 225, a set of one or more process flags fields 230, and a timestamp 235, but in other embodiments more or fewer fields may be present. In embodiments, some or all of the fields may be combined. For example, if all the columns in a table are keys, the row identifier field 215 and the data field 220 are the same columns in the table 205.

The action field 210 identifies an action or operation that was performed to the row 207. Examples of the actions 210 include an update or a delete action. In various embodiments, an update action may be either the insert of an entirely new row (with a new row identifier 215) or the update of the data 220 in an existing row. A delete action indicates the removal of the data row identified by the row identifier 215. The row identifier field 215 indicates a unique combination of all the key (row identifier) columns for that table 205 in the database 152. Multiple rows in multiple different versions of the database 152 with the same row identifier 215 are said to be different versions of the same row.

The row identifier field 215 corresponds to the key columns in a table of the database 205. In the database 152, the row identifier 215 corresponds to all the key columns. Multiple versions of the database 152 are said to contain the same data row 207 if the row identifier or key columns 215 for a data row from each database version include identical values. The non-key columns may differ between the database versions, but so long as the key columns match, both rows are said to have the same row identifier 215. Potential data collisions occur when a row of data having a row identifier 215 in one version of the database 152 is moved over the top of another row of data having the same row identifier 215, but a different reason identifier 225, in another version of the database 152.

The data field 220 indicates any and all non-key columns of the database 152 containing any valid data values. Multiple rows 207 in different versions of the database 152 with the same row identifier 215 may contain different values in the data 220; in such a case, the rows in the different versions also have a different reason identifier 225.

The reason identifier field 225 includes a reference to a reason data object in the reason data 154 (FIG. 1), which is further described below with reference to FIG. 4. The process flags field 230 may include any number of flags or indicators, each corresponding to a dependent application 153. The timestamp 235 indicates the date and/or time that the row 207 was last modified or inserted into the table 205. The action related to the last modification is reflected in the action field 210.

In response to an update to an existing or new data row 207, the database management system 150, in an embodiment, sets the process flags 230 to match the action 210. When the dependent application 153 processes the action 210, the dependent application 153 updates the process flag 230 associated with that dependent application 153 to indicate a processed state. In the case of an action 210 of delete, the dependent application 153 removes the row 207 from the database 152 only after all the process flags 230 are in the processed state and only after writing the row 207 with the delete action 210 to the journal 156, in case a later restore is required. For example, if the move application 159 is the last dependent application 153 to process a delete action, then the move application 159 deletes the row after sending the row to the journal 156. But, if the move application 159 is not the last application to process a delete, then the move application 159 cannot delete the row 207 because doing so would prevent the dependent applications that have not yet processed that row from purging the row from their respective data. In another embodiment, an optional unillustrated clean-up application periodically executes, journaling and deleting all rows that are marked for deletion via the delete action 210 for which all process flags 230 are set.

Figure 3:
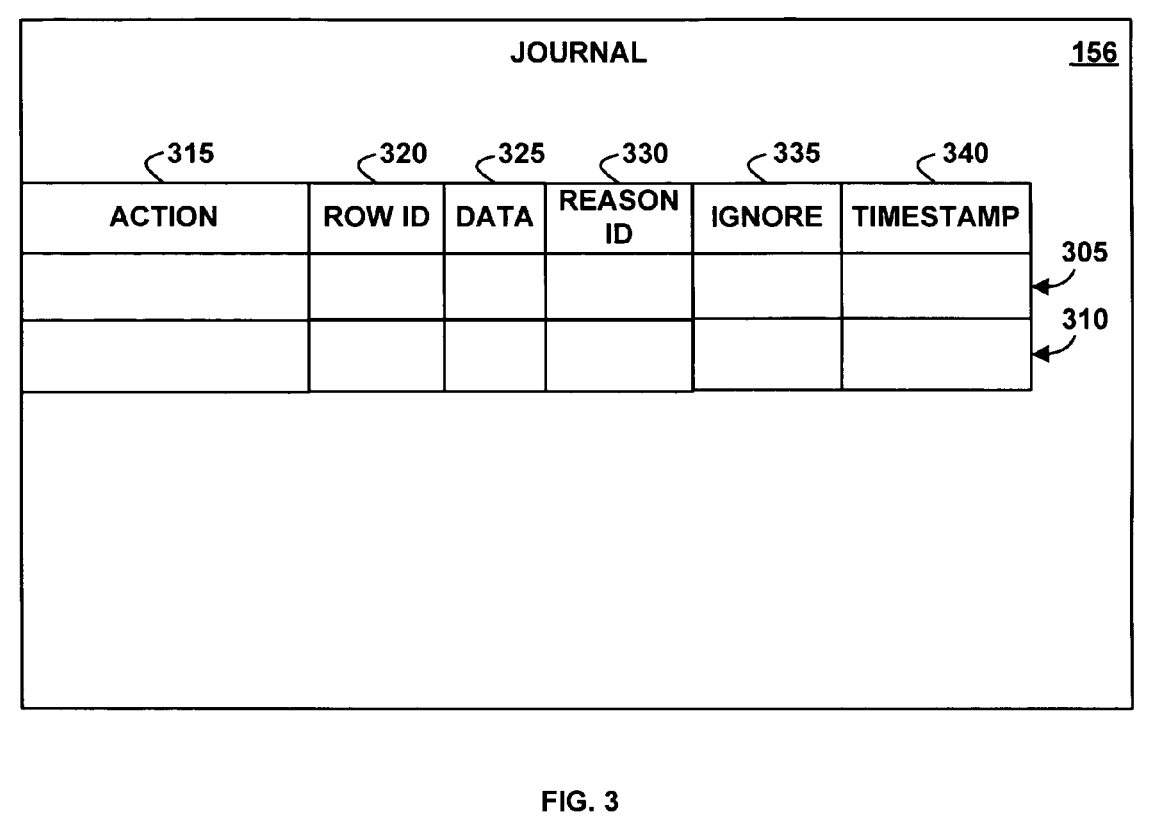

FIG. 3 depicts a block diagram of an example journal 156, according to an embodiment of the invention. The journal 156 includes example records 305 and 310, but in other embodiments any number of records with any appropriate data may be present. Each of the records 305 and 310 includes an action field 315, a set of row identifier fields 320, a set of data fields 325, a reason identifier field 330, an ignore field 335, and a timestamp field 340. But, in other embodiments more or fewer fields may be present. The row identifier field 320, the reason identifier field 330, and the timestamp field 340 are said to be key columns of the journal 156.

The set of action fields 315 indicates whether the data 325 was marked for deletion or was updated. The action field 315 indicates the previous change (e.g., delete or update) that is associated with the reason identifier 330 in the same record. The set of row identifier fields 320 identifies rows in the database 152. The set of data fields 325 includes the data that was present in the database 152 prior to the change to the database 152 that is associated with the row identifier 320 of the record. The set of reason identifier fields 330 indicates the reason that the row 320 was modified prior to the update that caused the record to be written to the journal 156. The ignore field 335 indicates whether this record is to be ignored during demote operations. The timestamp field 340 indicates the date and/or time that the record ceased to exist in the database 152 because the record was modified. An aggregation of the timestamp field 340 across multiple records specifies an order in time that changes to the database 152 were made. The row identifier 320, the reason identifier 330, and the timestamp 340 identify the record in the journal 156.

Figure 4:
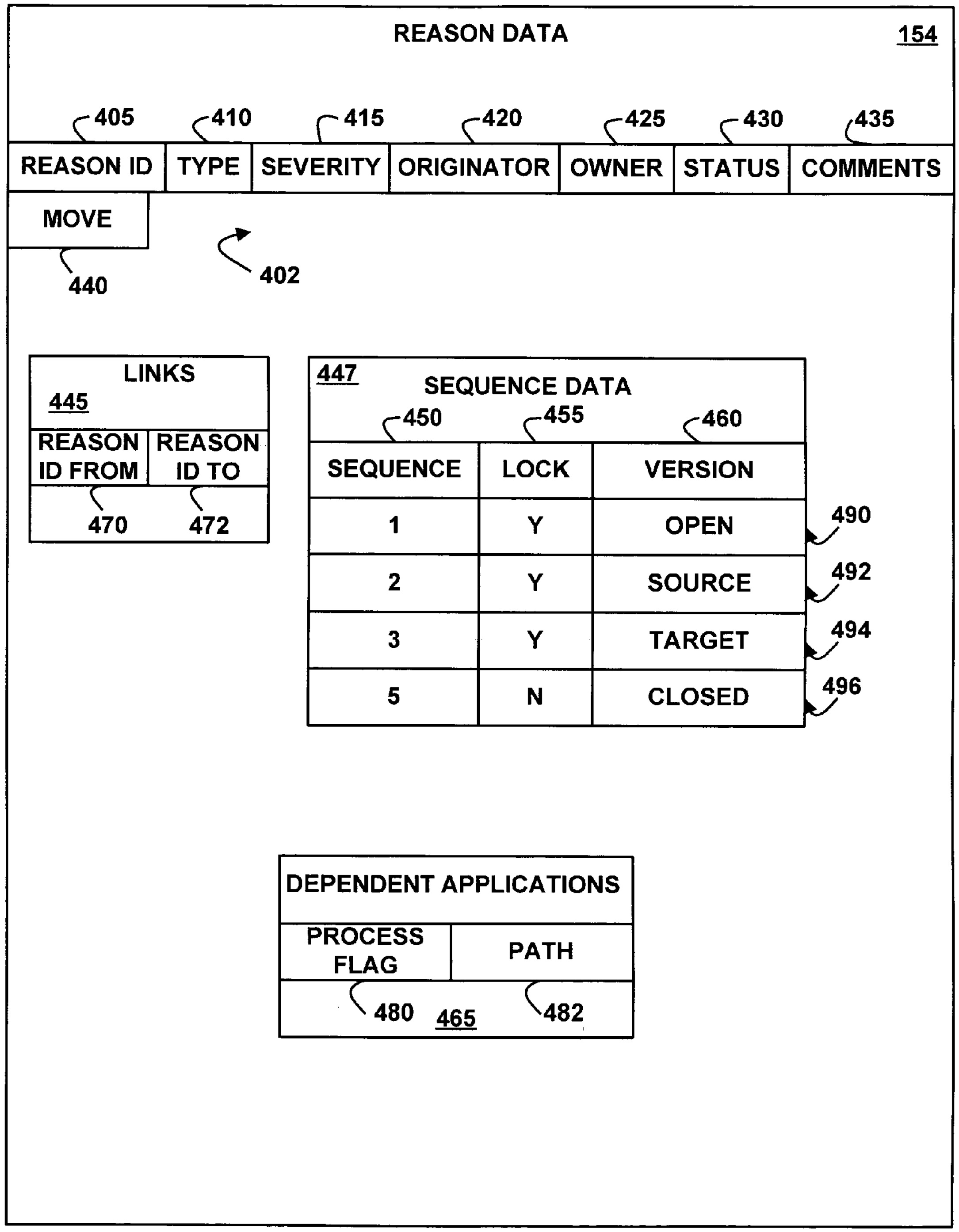
FIG. 4 depicts a block diagram of example reason data, according to an embodiment of the invention.

FIG. 4 depicts a block diagram of example reason data 154, according to an embodiment of the invention. The reason data 154 includes any number of reason data object records 402. The reason data object record 402 indicates a reason, an explanation, a defect, or a change request associated with, or responsible for, the most recent change to the data row 207 (FIG. 2). Each of the reason data object records 402 includes a reason identifier field 405, a type field 410, a severity field 415, an originator field 420, an owner field 425, a status field 430, a comments field 435, and a move field 440. In other embodiments, more or fewer fields may be present.

The reason data 154 further includes a links list 445, sequence data records 447, and dependent applications records 465, which are common to all the reason identifier records 402. In other embodiments, more or fewer records may be present.

The links list 445 includes a reason identifier from field 470 and a reason identifier to field 472. The sequence data field 447 includes records 490, 492, 494, and 496, but in other embodiments any number of records with any appropriate data may be present. Each of the record 490, 492, 494, and 496 includes a sequence field 450, a lock field 455, and a version field 460. The dependent applications field 465 includes a process flag 480 and a path field 482.

The reason identifier field 405 indicates a unique identifier for each reason for a change to the database 152, such as the reason identifiers 225 and 330. Changes (inserts, updates, or deletes) to multiple rows 207 in the database 152 may use the same reason identifier 405. Thus, in various embodiments, changes to different rows, to different database tables, to different databases 152, and to different versions of databases 152 may all be linked together via a single reason identifier 405.

The type field 410 indicates a type of the reason identifier 405. For example, the type 410 may include whether the change associated with the record 402 was made as an enhancement to the data or to fix a problem with the data, but in other embodiments any appropriate type may be used. The severity field 415 identifies a severity or importance of the change associated with the record 402. The originator field 420 indicates the client 132, the reason application 134, or the user associated with the client 132 or reason application 134 who requested the change associated with the record 402. The owner field 425 indicates the owner of the change associated with the record 402.

The status field 430 indicates the most recent (the highest) version 460 of the database 152 to accept the changes associated with the reason identifier 405 as rows 207 associated with the reason identifier 405 are promoted through the versions 460 of the database 152. In addition, the status 430 may indicate other control states in the sequence 450, such as open, accepted, rejected, closed, or any other appropriate status. A status 430 of "open" indicates that the reason identifier 405 was opened and is awaiting action in the first version (in the sequence 450) of the database 152. A status 430 of "closed" indicates the data associated with the reason identifier 405 is in the last version (in the sequence 450) of the database 152 and has been validated to be correct.

The reason identifier 405 is complete in the database versions 460 that are lower in the sequence 450 than the value the reason identifier 405 has in the status field 430. The reason identifier 405 is said to be not complete in the database version 460 that is equal to the value the reason identifier 405 has in its status field 430. The reason identifier 405 will not exist in database versions 460 that are greater than the value the reason identifier 405 has in its status field 430. A status 430 of "closed" indicates that the reason identifier 405 is complete in all database versions 460. When a reason identifier 405 is complete, no collision has occurred if subsequent reason identifiers 405 modify the same data rows 207 in the database 152. Thus, the status field 430 specifies whether or not a data move that encounters a different reason identifier associated with an identical row identifier is a collision.

If a data promotion into the current database version encounters a reason identifier 225 that is complete in the current database version, then the reason identifiers do not collide. If the reason identifier 405 is not complete in the current database version, then the reason identifiers do collide, and the data promotion handles the collision. On the other hand, reason identifiers 225 are only demoted out of a database version where the reason identifier 405 is not complete. If the reason identifier 405 is complete in the current version, then the demotion begins from a higher version where the data has moved and the reason identifier 405 is not complete for that version.

The comments field 435 references an object containing a commentary about a reason identifier 405 including, among other possible information, the rationale for the reason identifier 405. The comments field 435 may be modified by the reason application 134 and the move application 159. In an embodiment, the comments field 435 may either be a CLOB (Character Large Object) in the database 152 or a path stored in the database 152 that references a protected external file that only the move application 159 and the reason application 134 are authorized to access. But in other embodiments, any appropriate type of the comments field 435 may be used and other appropriate applications may access the comments field 435.

The move field 440 indicates whether to promote or demote the change associated with the record 402 between versions of the database 152 or possibly other control states in the version sequence, such as, open, accepted, rejected, or closed, but in other embodiments any appropriate control state may be used. If the move field 440 indicates promotion, the move application 159 promotes (between versions of the database 152) all data rows 207 that are related to the reason identifier 405 when the move application 159 is next invoked, and then the move application 159 changes the move field 440 to indicate that no promotion or demotion is needed. If the move field 440 indicates demotion, the move application 159 demotes all data rows related to the reason identifier 405 when the move application 159 is next invoked, and then the move application 159 changes the move field 440 to indicate that no promotion or demotion is needed.

The links list 445 includes a linked list of reason identifiers from 470 and reason identifiers to 472, which need to be promoted or demoted together.

The sequence field 450 specifies a sequence or order for promotion and demotion of the versions 460 of the databases 152, which indicates the direction that data moves during a promote operation and the conceptual direction of a demote operation, although data does not move between versions 460 of the databases 152 during a demote operation. Thus, versions of the database that are higher in the sequence 450 contain at least some data that is older (was added or changed at an earlier time) than versions of the database that are lower in the sequence 450, which contain data that is newer, more up-to-date, or was added or changed at a later time. A promote operation copies changes to the rows 207 upward in the sequence 450 of the versions 460 of the database 152, and a demote operation moves changes to the rows 207 from a target journal to a target version of the database 152, depending on reason identifiers associated with corresponding rows in the source version of the database 152 that is downward in the sequence 450 of the versions 460 of the database 152.

The lock field 455 specifies in which version 460 a reason identifier 405 must exist in order for the lock 455 to be released. For example, if the lock 455 is at a record with a sequence 450 of "3," then a specific modified data row 207 cannot be modified again in any version until the row 207 has been promoted to the "3$^{rd}$" version 460 of the database 152. This means the user cannot insert new data for data row 207 until the row 207 has been promoted to the 3$^{rd}$ version 460 of the database 152. If the reason identifier 405 status 430 indicates the bottom version of the database 152 in the sequence 450, the user may or may not be able to make multiple data inserts in the database version 460 of database 152 depending on the journaling strategy of the embodiment referred to in FIG. 14. In another example, if the lock version 455 is at sequence 450 of "1," then the lock 455 is released as soon as data is inserted to the row 207, so effectively no locking exists. In an embodiment, a sequence number 450 for a closed version 460 beyond the last version 460 may be used to indicate that the lock 455 may need to remain in effect until the change to the row 207 is validated in the final version (e.g., the version 460 in the record 496) and closed.

The version field 460 specifies a list of the versions of the databases 152 that are ordered in the sequence 450. The first database version in the sequence 450 after a version of open is unique because, in an embodiment, the first version (e.g., record 490) is the only version where the entry of new data to a row 207 occurs. The last database version 460 before a closed version in the sequence 450 is also unique because, in an embodiment, the promote of data from this version moves no data. The special case of promote from this version marks a reason identifier 225 as closed, indicating completion.

The process flag 480 includes a listing of all process flags 230 that must be present on all rows 207 and the dependent applications 153 that utilize each of the process flags 230. The path field 482 indicates the file name, the path of directories, the server name or address, or any portion or combination thereof that identifies the location of the dependent application that is invoked to move data from the database 152 to the dependent application 153.

Figure 5:
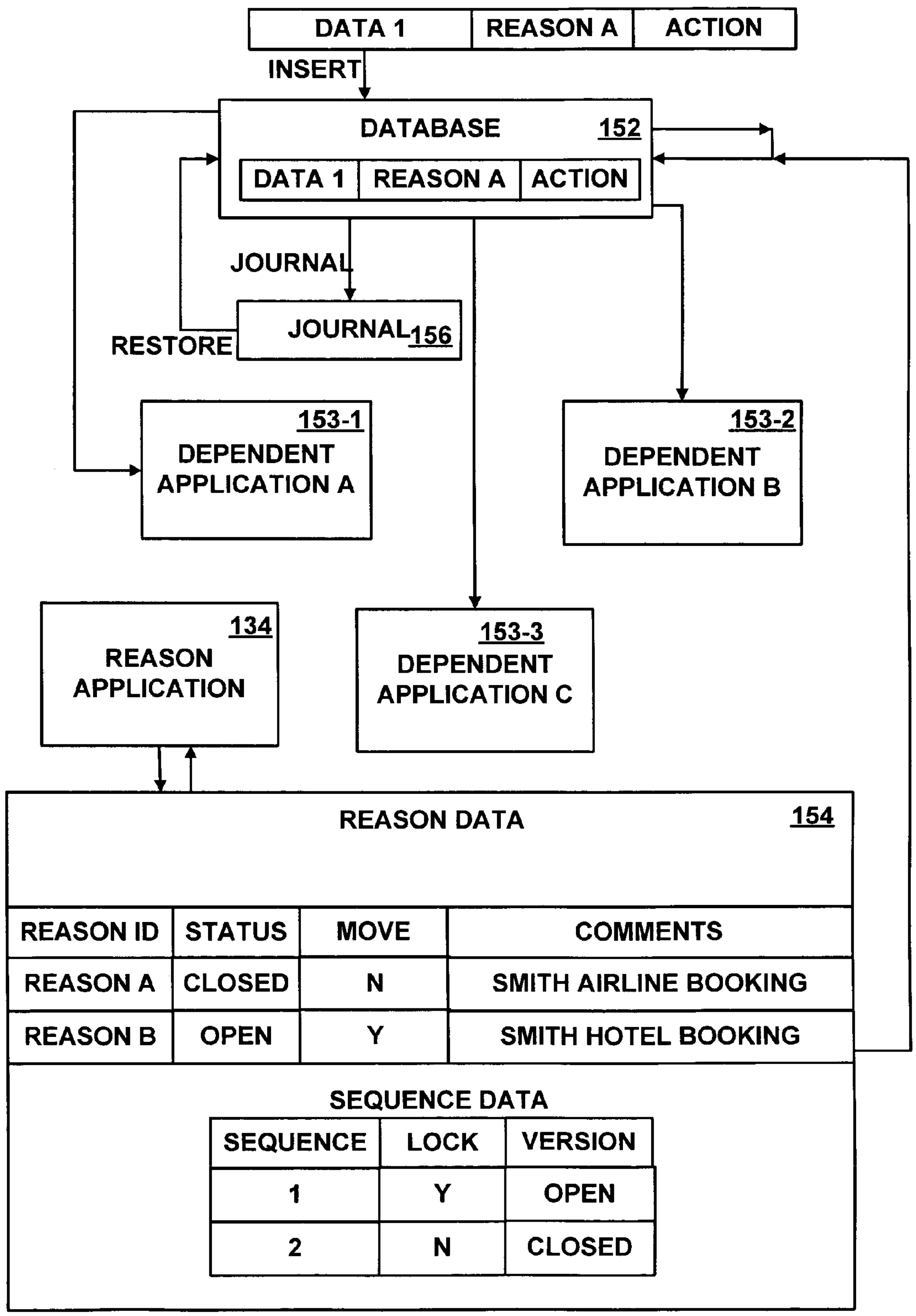
FIG. 5 depicts a block diagram of the relationship of a database, a journal, reason data, and reason applications for a restore operation, according to an embodiment of the invention.

FIG. 5 depicts a block diagram of a relationship of the database 152, the journal 156, the reason data 154, the reason application 134, and data dependent applications 153-1, 153-2, and 153-3, generically referred to in FIG. 1 as a dependent application 153, according to an embodiment of the invention. Prior to entering data into the database 152, the reason application 134 opens a reason identifier 405. When the data modifications are changed (insert, update, or delete) in the database 152, a reason identifier 225 for the change is entered to the row 207. As the data in the database 152 is modified, the previous data row 207 (if any) is copied to the journal 156. As long as the reason identifier 225 remains open, all changes due to that reason (regardless of when they were made) may be demoted from the database 152. Because only a single database 152 exists, in this embodiment, demoting the changes means the changes are atomically removed from the database 152 and previous data values (if any) are restored from the journal 156 without disturbing any other data associated with any other reason identifiers in the database 152. Once the changes for the reason identifier 225 are complete, the reason application 134 marks the reason identifier 225 as closed via the status field 430. Once a reason is completed and closed, the changes due to the reason identifier 225 can no longer be removed, but all associated data in the journal 156 and reason data 154 remain as part of the historical record.

Closing the reason identifier 225 also frees up any rows 207 modified by reason identifier 225 to be modified by other reason identifiers. As long as the reason identifier 225 is not complete, data updates due to additional reasons may collide resulting in either the update being blocked, or the two reason identifiers becoming linked.

Reasons that are linked behave as one reason. Thus, if changes due to either linked reason are restored from the journal 156, then data changes from the other linked reason are also restored from the journal 156. Similarly, if one reason identifier 225 is completed and closed, then the other one is also completed and closed, and appropriate collision and completeness checks are performed on all linked reason identifiers 405.

The data dependent applications 153-1, 153-2, 153-3 are applications that rely on the contents of the database 152, either by reading the database 152 directly or by copying data from the database 152 into databases local to each data dependent application 153-1, 153-2, and 153-3. The stability of the data dependent applications 153-1, 153-2, and 153-3 is facilitated by the selective update and removal of database 152 changes that the reason identifiers 225 facilitate. The reason identifiers 225 combined with action and update flags also facilitate incremental, trickle feeds of data changes to each of the data dependent applications 153-1, 153-2, and 153-3.

Figure 6:
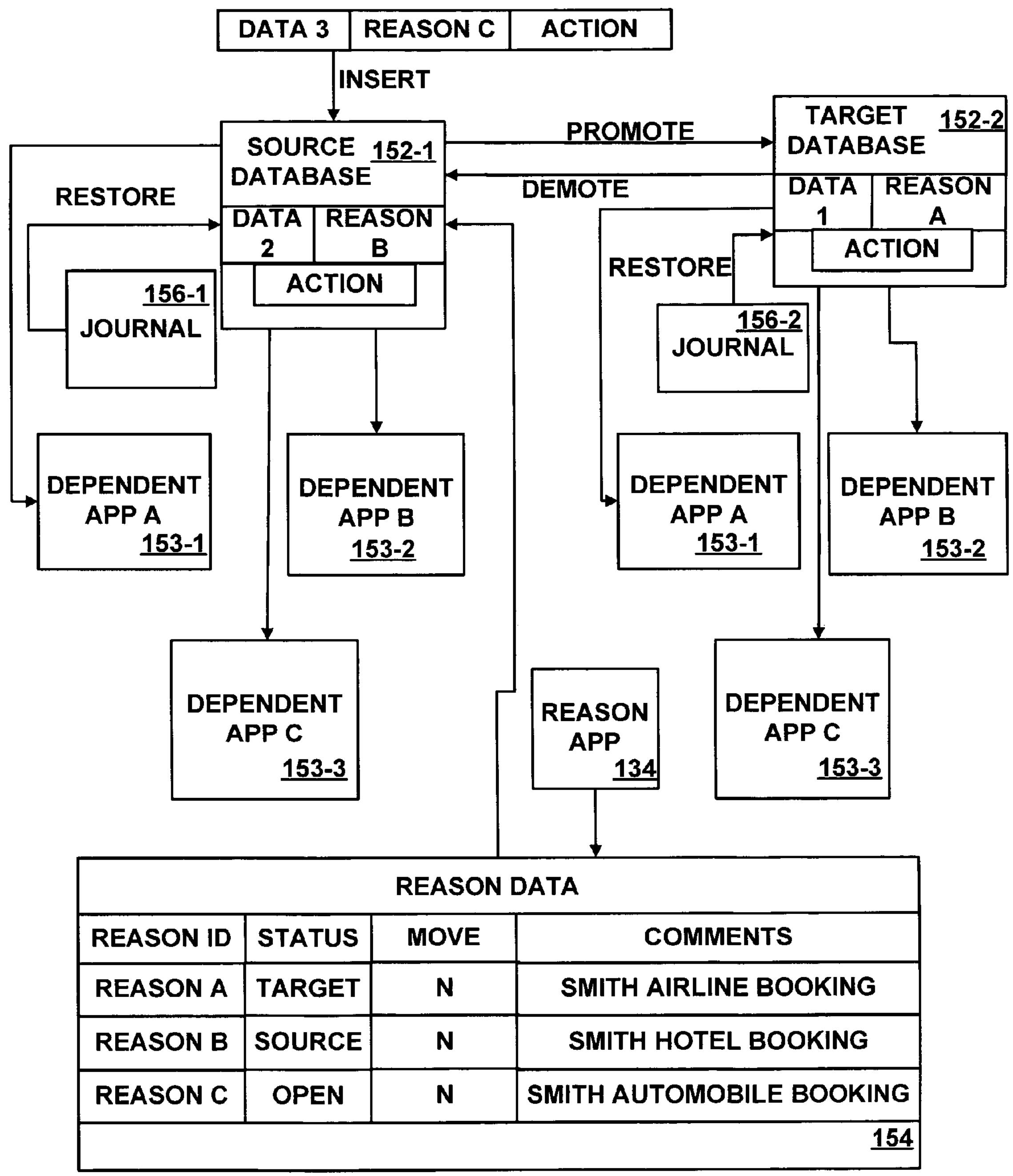
FIG. 6 depicts a block diagram of the relationship of database versions, journals, reason data, and reason applications for an insert operation to a single database version, according to an embodiment of the invention.

FIG. 6 depicts a block diagram of two versions 152-1 and 152-2 of the database 152 (FIG. 1) of an embodiment of the invention, the associated journals 156-1 and 156-2, and data dependent applications 153-1-2, 153-2-2, 153-3-2. The depiction of multiple data dependent applications 153-1-2, 153-2-2, 153-3-2 is typical of a code development environment where multiple generations of the same program may exist at once, but in other embodiments any appropriate type of application may use multiple database versions. Similarly, the different database versions 152-1 and 152-2 represent multiple versions of the database 152 that may coexist. Two versions 152-1 and 152-2 are depicted in FIG. 6, but other embodiments any appropriate number of versions of the database 152 may be used. Once the reason application 134 creates the reason identifier 225, new data may be inserted into the source database 152-1. Then, the reason application 134 marks the reason via the move field 440, which causes the move application 159 to move changes to the target database 152-2 or causes the move application 159 to remove changes from the target database 152-2.

Because of the additional database 152-2 version, the reason identifiers 225 may have an associated status 430 that indicates the source and target databases 152, in addition to a status that indicates the reason identifier 405 is open or closed. In an embodiment, promoting data associated with a reason identifier 405 from the source database 152-1 to the target database 152-2 may collide with unclosed reasons 405 in the target database 152-2, reflecting recent changes in the target database 152-2. Similarly, demoting a reason identifier 405 from the target database 152-2 to the source database 152-1 may collide with recent inserts to the source database 152-1.

Figure 7:
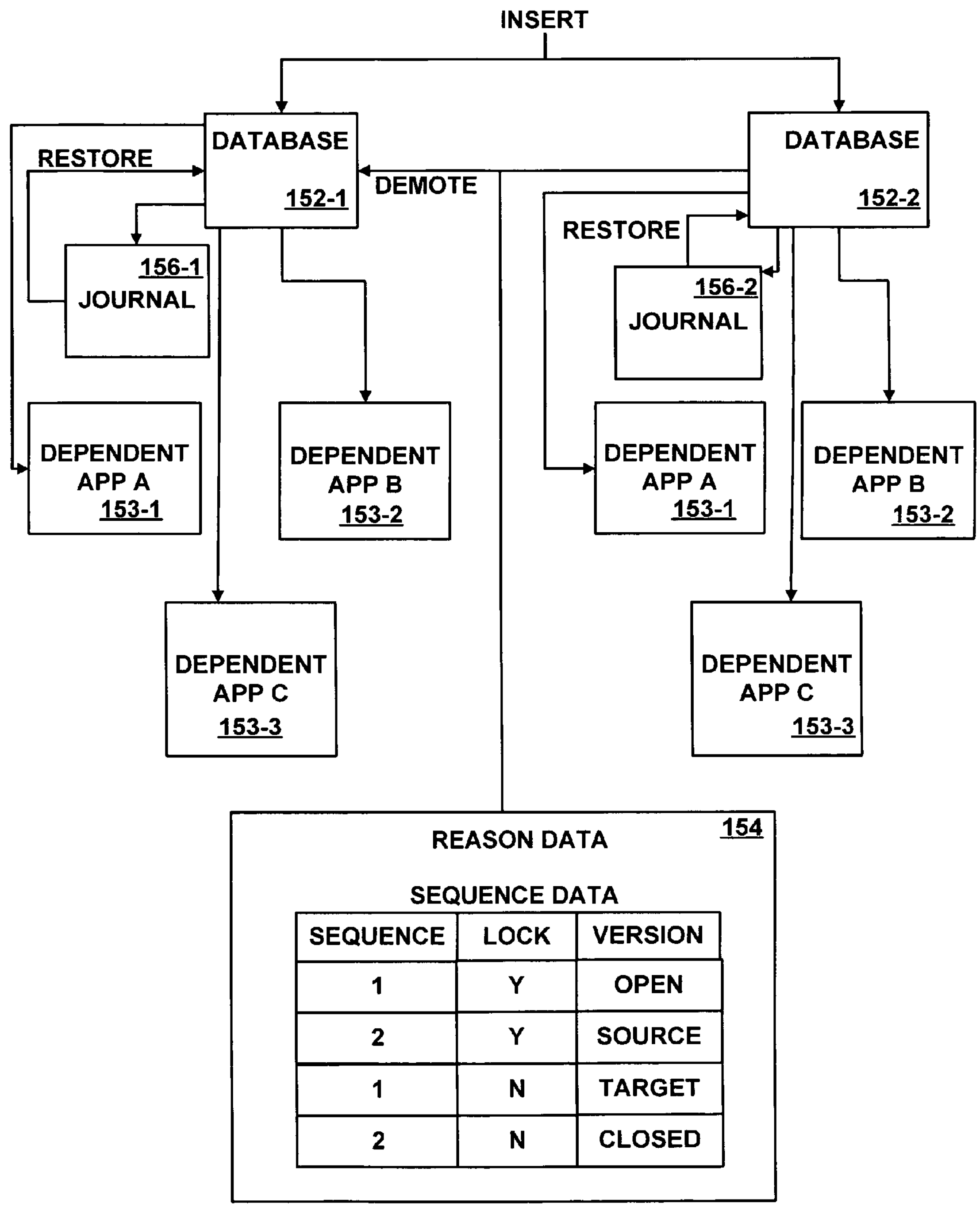
FIG. 7 depicts a block diagram of the relationship of a database versions, journals, reason data, and reason applications for promote and demote operations and an insert operation to multiple database versions, according to an embodiment of the invention.

FIG. 7 depicts a block diagram of the relationship of a database versions 152-1 and 152-2, journals 156-1 and 156-2, reason data 154, and dependent applications 153-1, 153-2, and 153-2 for promote and demote operations and an insert operation to multiple database versions, according to an embodiment of the invention. In an embodiment, insert operations to multiple database versions may be a fix capability to fix data high in the sequence 450 without using a more time-consuming process of inserting data to one database version and then promoting the changed data to another database version. Coherency causes the same change to the row 207 to be made simultaneously (or close in time) to all database versions downward in the sequence 450 and causes all other update activity to be suspended and locked while other versions are updated. This capability still requires an open reason identifier 405. Data conflicts might occur in every version of the database 152 that is modified, but the links list 445 for the reason identifier 405 are only modified for the reason identifiers 405 that do not have a complete status 430 in the highest database version 460 in the sequence 450 that is modified. The conflicts in the lower database versions 460 are logged and communicated for later cleanup, but the data insert is forced over the top of any conflicts. In an embodiment, the change to the row 207 was verified in the lowest database version 460 in the sequence 450 before using the same reason identifier 405 to perform the insert to the multiple database versions. The collision fixes require new reasons, data inserts, and promotions.

Figure 8:
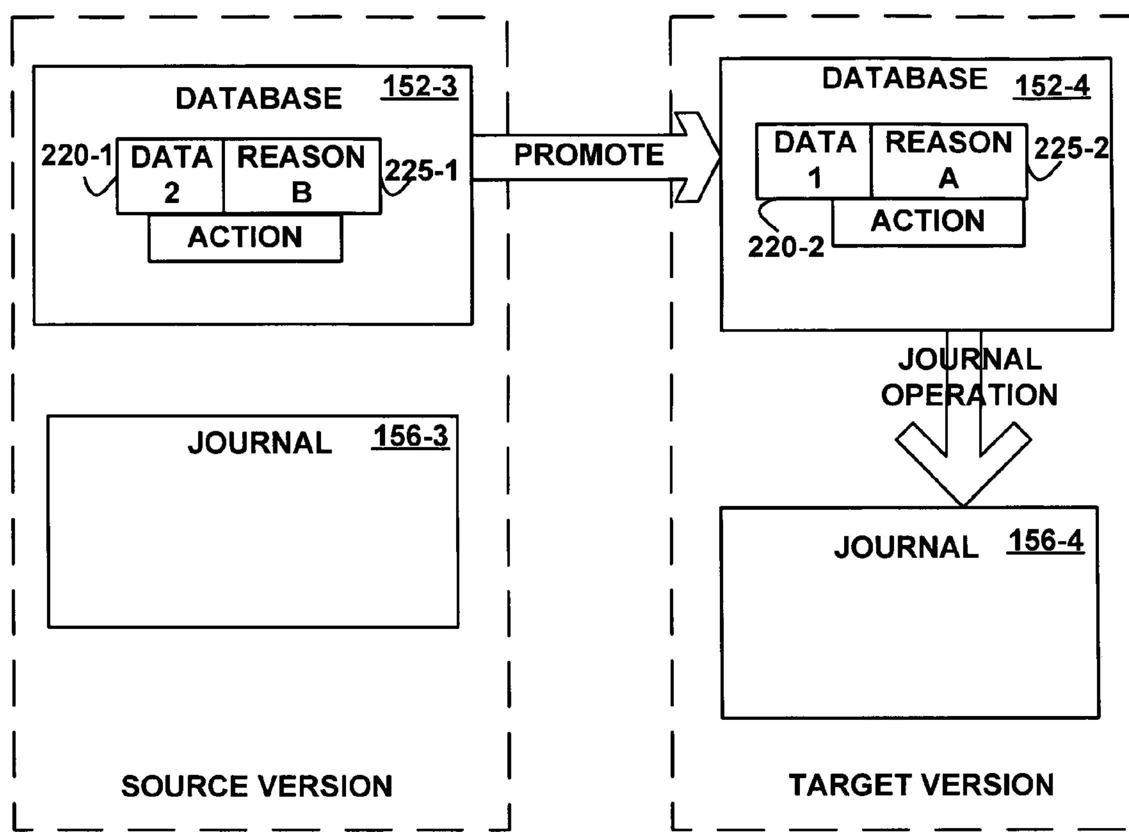
FIG. 8 depicts a block diagram of a promote operation between versions of a database, according to an embodiment of the invention.

FIG. 8 depicts a block diagram of the data movement associated with a promote operation, which moves changes between versions 152-3 and 152-4 of the database 152, according to an embodiment of the invention. As new data enters a version, the old data is moved to the associated journal 156-3 or 156-4, in case the change must be later backed out, rolled back, or undone for any reason.

The promote operation illustrated in FIG. 8 moves the same row of data upward in the sequence 450 in the list of database versions 460, which are illustrated in FIG. 8 as the source database version 152-3 and the target database version 152-4. Thus, the row with "data 1" 220-2 is older than "data 2" 220-1, and "data 2" 220-1 is updating "data 1" 220-2. Also, note that "data 1" 220-2 was inserted for "reason A" 225-2, and "data 2" 220-1 was updated for a different "reason B" 225-1.

In simpler uses, e.g., the embodiment of FIG. 5, only a target database 152-4 and not a source database 152-3 exists. But, the insert of data can be viewed as a special case of promote where the source data is user supplied data rather than copied from a database 152. When multiple database versions exist, the insert operation still occurs in the first database version at the bottom of the versions 460 in the sequence 450.

Conceptually, in an embodiment, promotions only happen between two versions of the database 152-3 and 152-4, but in other embodiments promotions may occur between any number of versions. Other embodiments may be many layers deep with database versions, but any promotion only happens between two adjacent versions so promotion can only move data through the versions one version at a time. In some distributed embodiments, the promote operation may target several identical and redundant databases 152-4 but they may all be viewed as equivalent and may receive identical data through the promotion process.

Promoting data includes handling collisions between multiple changes to rows 207 that have the same row identifier 215, but different reason identifiers 225, in different versions of the database 152. At times, a more recent change arriving from a source version database 152-3 encounters and overlays a previously-made change in the target database 152-4 that was not yet promoted to the next level. Thus, a collision occurs when two different changes to the same data row 207 that have same row identifier 215, but different reason identifiers 225, are promoted over the top of each other. Two database versions are said to contain the same data row when the row identifier or key columns 215 for a data row 207 from each database version contain identical values. The non-key columns may differ between the database versions, but so long as the row identifiers 215 match, both rows are said to be the same row, and the target database will have the non-key columns in that row updated.

Or, a delete action may be specified to delete the entire row 207. If the row identifiers 215 differ, then the target database 152 does not contain the same row and can only experience an insert. Both inserts of new rows 207 and modifications to existing rows 207 are referred to as update actions. A collision requires special handling, including lock checking to either prevent the newer data from arriving or to correctly manage and communicate that newer data has overlaid older data.

Figure 9:
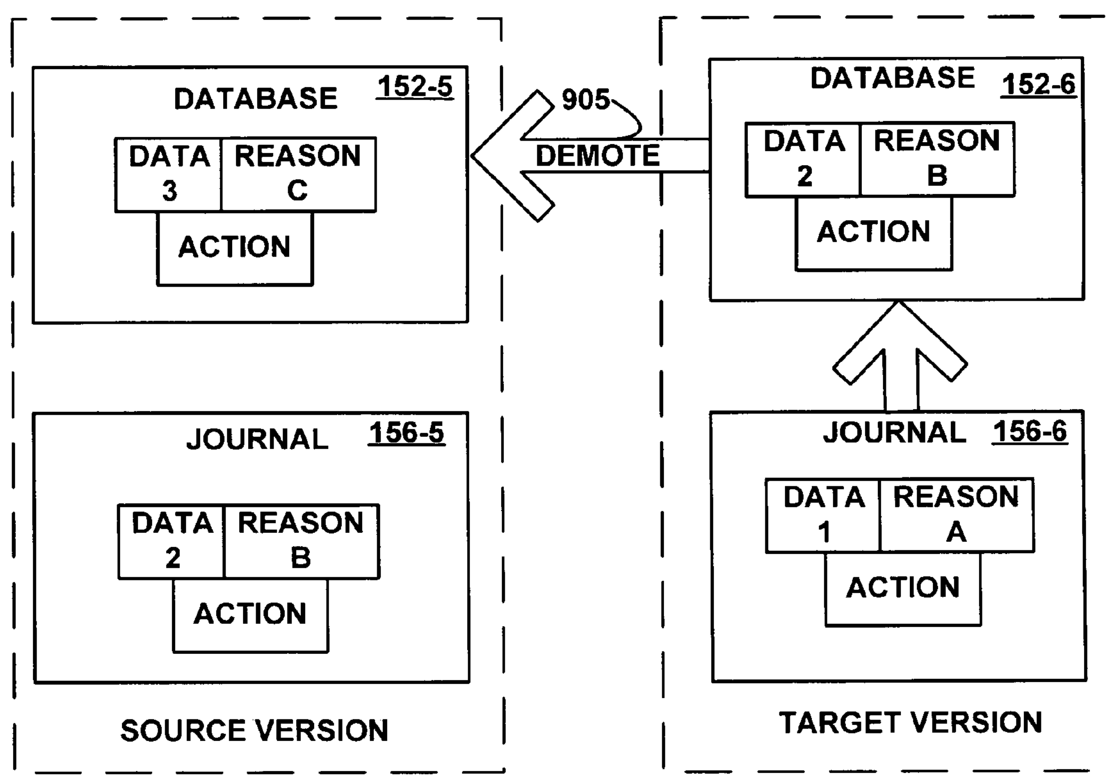
FIG. 9 depicts a block diagram of a demote operation, according to an embodiment of the invention.

FIG. 9 illustrates two different versions, a source version 152-5 and a target version 152-6 of the database 152, which include the same data row as indicated by the row identifier or key columns 215 in the table containing that row. The data moves from the target database version 152-6 to the source database 152-5, but "data 1" is older than "data 2," which is older than "data 3." "Data 1" was updated for "reason A," and "data 2" was updated for "reason B."

In more simple uses, only a target database 152-6 and no source database 152-5 exists. So when the demote occurs, no source database 152-5 exists. The moved data is effectively removed by this special case of the demote operation. In contrast, when multiple databases 152 exist, the remove operation still occurs when a demote is performed in the first database 152 at the bottom of the versions 460 in the sequence data 447.

Conceptually, demotions only happen between two versions of the database 152-3 and 152-4, but in other embodiments demotions may occur between any number of versions. Other embodiments may be many layers deep with database versions, but any demotion only happens between two adjacent versions so demotion can only move data back one version at a time. In some distributed embodiments, the demote operation may originate in several identical and redundant target databases 152-4 but they may all be viewed as equivalent and are be identical following the demotion process.

Demoting data includes the handling of collisions between multiple changes because the same row 207 has two changes in direct sequence. A problem with the initial change may prompt the demotion of that change from the target database 152, but doing so overwrites a newer change in the source database 152 to the same row identifier 215. This collision requires handling to either prevent the demotion from occurring or to manage and communicate that the initial change is discarded in favor of newer data and linking the reason identifiers 405 together in the links list 445.

The demote arrow 905 reflects a conceptual move but no data actually flows between the target database 152-6 and source database 152-5. An undo and restore of data is performed from the target journal 156-6 to the target database 152-6. The path of the arrow 905 is used by the move function to look for collisions that require the Reason B and Reason C reason 405 identifiers to be linked through the links list 445 and treated as one reason in future operations. In addition, the demote arrow 905 depicts the change of status 430 associated with the reason identifier 405 of Reason B from the target version 494 to the source version 492.

Figure 10A:
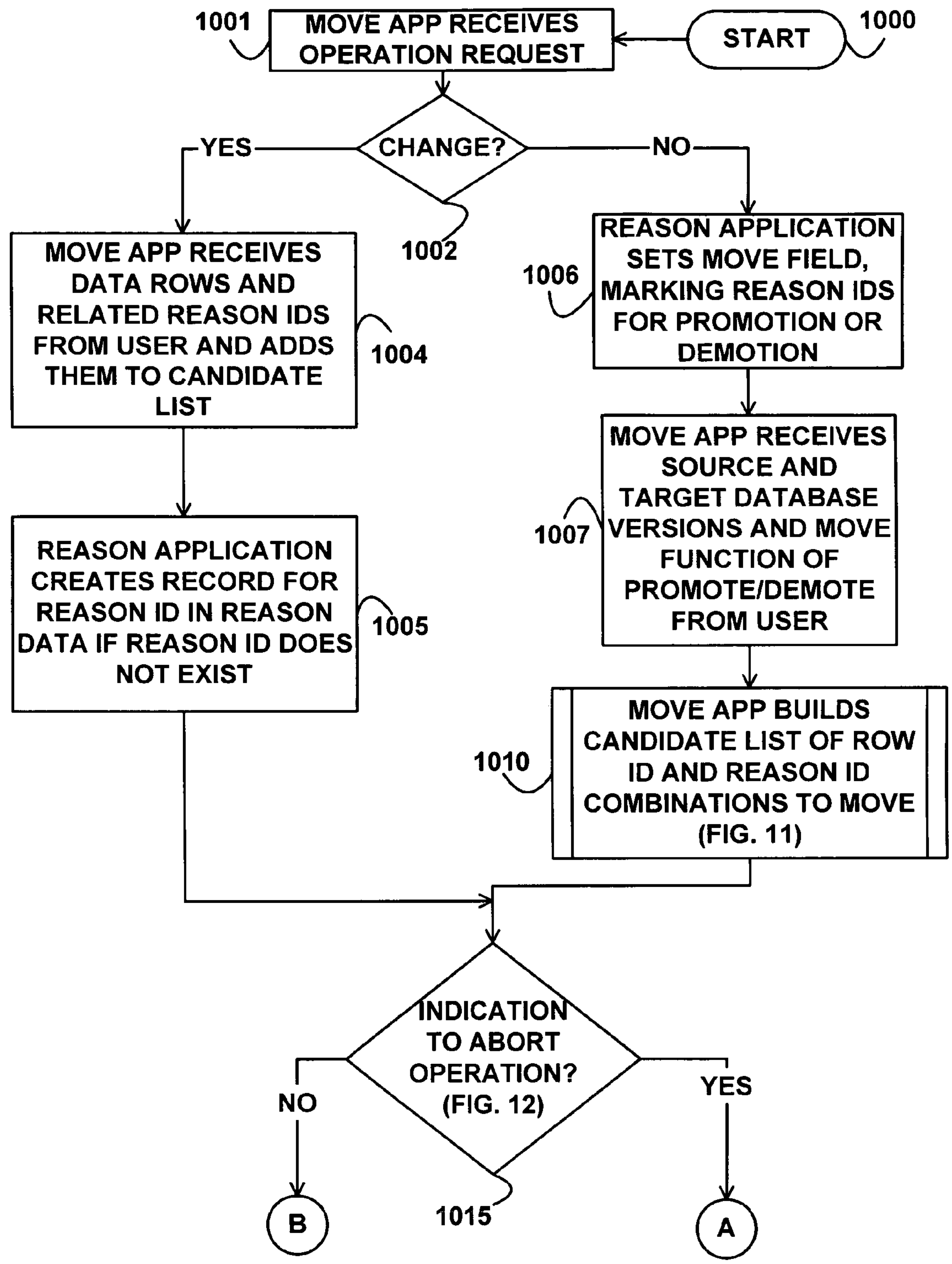
FIG. 10A depicts a flowchart of the processing for the data move operations of insert, update, delete, promote, demote, and undo, according to an embodiment of the invention.
Figure 10B:
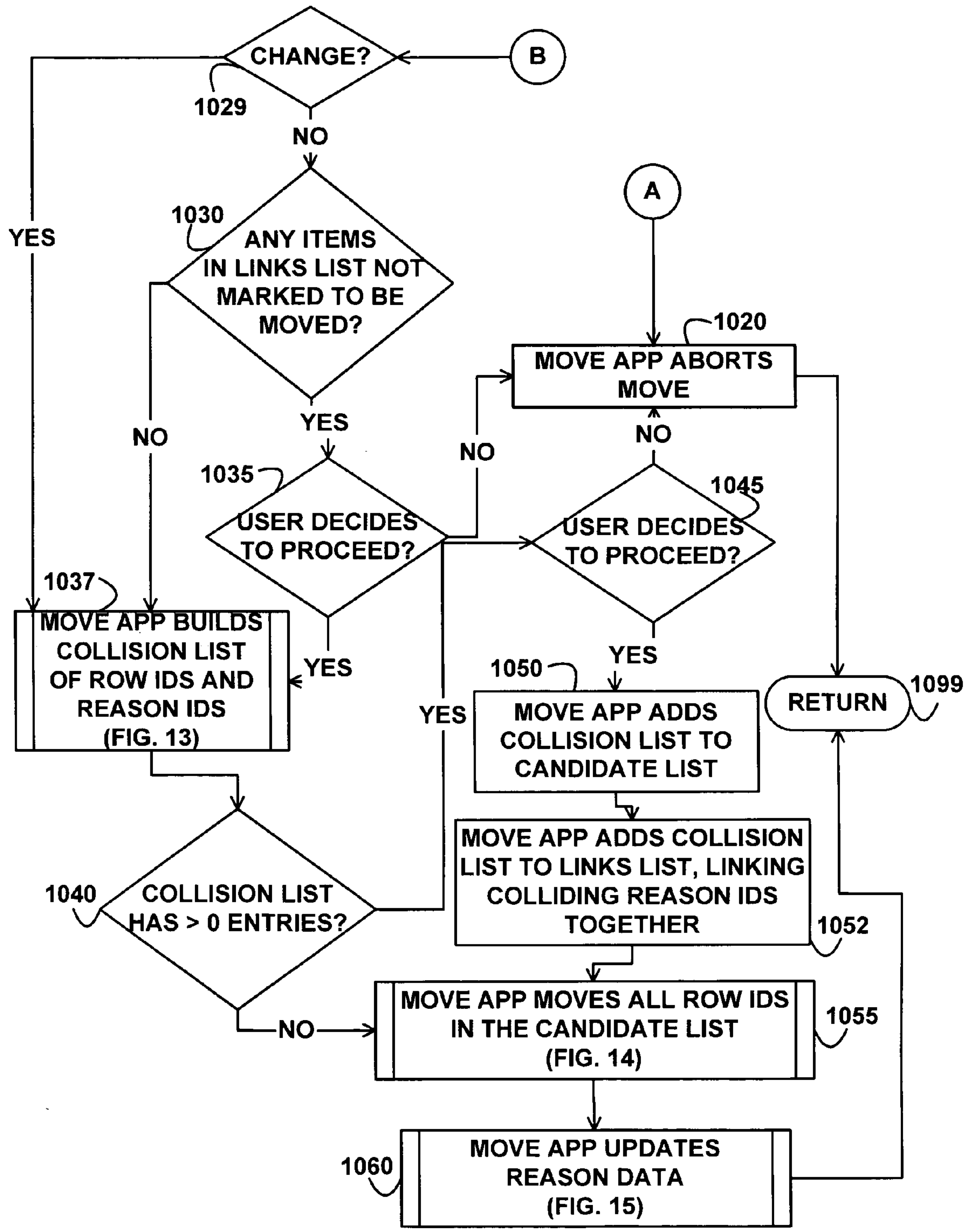
FIG. 10B depicts a flowchart of further processing for the data move operations of insert, update, delete, promote, demote, and undo, according to an embodiment of the invention.

FIG. 10A and FIG. 10B depict flowcharts of the processing for the data move application operations of insert, update, delete, promote, demote, and undo, according to an embodiment of the invention. The flowcharts of FIG. 10A and FIG. 10B apply to the examples illustrated in FIGS. 5 and 6 and to any other appropriate examples. Control of the logic of FIG. 10A begins at block 1000. Control then continues to block 1001 where the move application 159 receives a request for an operation, such as a change operation (insert, update, or delete) directed to a single version of a database or a move operation (promote, demote, or undo).

A change operation requests the addition of a new row or rows to a single target version of the database 152 (as opposed to moving rows between versions of the database 152) or requests the updating or deleting of an existing row or rows in a single target version of the database 152, as previously described above with reference to FIGS. 5, 6, and 7.

A promote operation requests the copying of an existing row or rows identified by a reason identifier(s) 405 from a source version of the database 152 to a target version of a database 152, upward in the sequence 450 of versions 460. If the source version of the database 152 is the last database version 460 in the sequence 450, the promote operation (which is in this case referred to as a close operation) merely makes the change as closed via the status field 430.

A demote operation requests the removing of an existing row or rows identified by a reason identifier(s) 405 from a target version of the database 152 and replacing them with the rows having the same row identifiers in the target journal 156, depending on the existence of corresponding rows in a source version of the database 152, which is downward in the sequence 450 of versions 460 from the target version of the database 152. If the target version of the database is the first version 460 in the sequence 450, the demote operation (which in this case is referred to as a remove operation) removes the data changes from appearing in any database version. If only a single version of the database 152 exists, a demote operation, which moves data from the journal to the single version of the database without regarding to other versions, is referred to as an undo operation.

Control then continues to block 1002 where the move application 159 determines whether the requested operation is a change operation (insert, update, or delete) directed to a single target version of the database 152. If the determination at block 1002 is true, then the requested operation is a change operation (insert, update, or delete) directed to a single target version of the database 152, so control continues to block 1004 where the move application 159 receives a row identifier or identifiers, new or changed data, and a related reason identifier(s) 405 from the client 132.

Control then continues to block 1005 where, if the received reason identifier 405 does not already exist in a record 402 in the reason data 154, the reason application 134 creates a record 402 in the reason data 154 with a reason identifier 405 that identifies the change, the type 410 of the change, the severity 415 of the change, the originator 420 of the change, the owner 425 of the change, the status 430 of the change, the comments 435 associated with the change, and the move indicator 440. The reason application 134 initially sets the move indicator 440 to indicate neither promotion nor demotion.

Control then continues to block 1015 where the move application 159 determines whether any indication exists to abort the operation, as further described below with reference to FIG. 12. If the determination at block 1015 is true, then control continues to block 1020 (FIG. 10B) where the move application 159 aborts the move. Control then continues to block 1099 where the logic of FIG. 10B returns.

If the determination at block 1015 (FIG. 10A) is false, then control continues to block 1029 where the move application 159 determines whether the move application 159 is processing a change operation (insert, update, or delete) directed to a single target version of the database 152.

If the determination at block 1029 is false, then the move application 159 is in the process of promoting or demoting reason identifiers 405 between database versions or is in the process of performing and undo operation, so control continues to block 1030 where the move application 159 determines whether any items in the links list 445 are not marked to be moved via the move field 440. If the determination at block 1030 is true, then control continues to block 1035 where the move application 159 determines whether the user decides to proceed.

If the determination at block 1035 is true, then control continues to block 1037 where the move application 159 builds a collision list of row identifiers 215 and reason identifiers 405, as further described below with reference to FIG. 13. Control then continues to block 1040 where the move application 159 determines whether the collision list built by the processing of FIG. 13 has any entries.

If the determination at block 1040 is true, then control continues to block 1045 where the move application 159 determines whether the user decides to proceed. If the determination at block 1045 is true, then control continues to block 1050 where the move application 159 adds the entries in the collision list to the candidate list. Control then continues to block 1052 where the move application 159 adds the collision list to the links list 445, which links the colliding reason identifiers together. The colliding reason identifiers now function as a single reason identifier for future operations, meaning that future operations that operate against one reason identifier in the links list 445 operate against its linked reason identifier also.

Control then continues to block 1055 where the move application 159 moves all row identifiers 215 in the candidate list, as further described below with reference to FIG. 14. Control then continues to block 1060 where the move application 159 updates the reason data, as further described below with reference to FIG. 15. Control then continues to block 1099 where the logic of FIG. 10B returns.

If the determination at block 1045 is false, then control continues to block 1020, as previously described above.

If the determination at block 1040 is false, then control continues to block 1055, as previously described above.

If the determination at block 1035 is false, then control continues to block 1020, as previously described above.

If the determination at block 1030 is false, then control continues to block 1037, as previously described above.

If the determination at block 1029 is true, then the move application 159 is in the process of a change operation (insert, update, or delete) of data associated with a reason identifier 405 to a database 152 or a database version, so control continues to block 1037, as previously described above.

If the determination at block 1002 is false, then control continues to block 1006 where the reason application 134 sets the move field 440 for selected reason identifiers 405 to indicate a request for promotion or demotion. Although block 1006 is illustrated subsequent to blocks 1001 and 1002 in FIG. 10A, in other embodiments, the processing of the reason application 134 represented by block 1006 may occur prior to the logic of blocks 1002 and/or block 1001.

Control then continues to block 1007 where the move application 159 receives a source database version, a target database version, and move operation (promote or demote) request from the user at the client 132. Control then continues to block 1010 where the move application 159 builds a candidate list of row identifier 215 and reason identifier 405 combinations to move, as further described below with reference to FIG. 11. Control then continues to block 1015, as previously described above.

Figure 11:
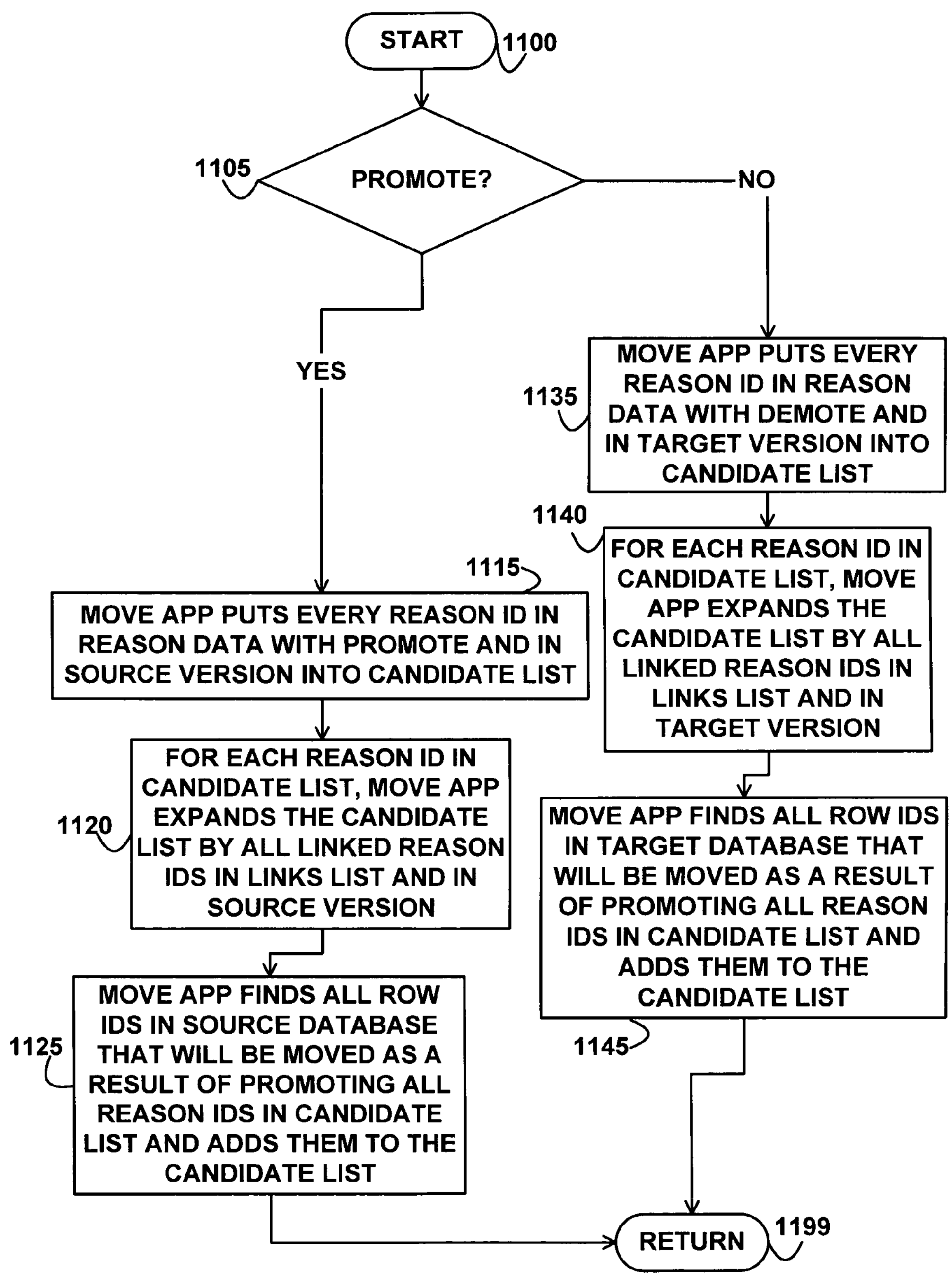
FIG. 11 depicts a flowchart of processing for building a candidate list of data rows to move, according to an embodiment of the invention.

FIG. 11 depicts a flowchart of processing for building a candidate list of data rows 207 to move, according to an embodiment of the invention. The contents of this candidate list is driven by the combination of row identifier 215 and reason identifier 405. The reason application 134 marks reason identifiers 405 via the move field 440 for promotion from a source version of the database 152 or demotion from a target version of the database 152, which drives the candidate list. In the case of initial data entry, the candidate list is driven by the row identifier 215, reason identifier 405 combinations entered by the user. In addition, promote and demote expand the list by any linked reasons in the links list 445. A data insert can expand the links list 445.

The logic of FIG. 11 begins at block 1100. Control then continues to block 1105 where the move application 159 determines whether the move application 159 is processing a promote operation. If the determination at block 1105 is true, then the move application 159 is processing a promote operation, so control continues to block 1115 where the move application 159 finds every reason identifier 405 in the reason data 154 that has the move field 440 marked for a promote and has the status field 430 with a version that matches the source version 460 into a candidate list. Control then continues to block 1120 where, for each reason identifier 405 in the candidate list, the move application 159 expands the candidate list by all linked reason identifiers 405 that are in the links list 445 and also have a status 430 that matches the source version. Control then continues to block 1125 where the move application 159 finds all row identifiers 215 in the source version of the database 152 that will be moved as result of promoting all reason identifiers 405 in the candidate list and adds the found row identifiers 215 and their associated reason identifiers 405 to the candidate list. Control then continues to block 1199 where the logic of FIG. 11 returns.

If the determination at block 1105 is false, then control continues to block 1135 where the move application 159 puts every reason identifier 405 in the reason data 154 with a demote indication and in the target version into a candidate list. (A demote operation demotes target rows 207 that are associated with selected target reason identifiers 405 from a target version of the journal 156 to a target version of the database 152.)

Control then continues to block 1140 where the move application 159, for each target reason identifier 405 in the candidate list, expands the candidate list by all reason identifiers 405 that are linked to the target reason identifier 405 via the links list 445 and that also have associated target row identifiers 215 in the target version of the database 152. By expanding the candidate list by the linked reason identifiers, the move application 159 treats the linked reason identifiers as a single reason identifier, i.e., an operation against one reason identifier operates against its linked reason identifier as well.

Control then continues to block 1145 where the move application 159 finds all target row identifiers 215 in the target database 152 that will be moved as a result of demoting all reason identifiers 405 in the candidate list and adds the found target row identifiers 215 and their associated reason identifiers 405 to the candidate list. Control then continues to block 1199 where the logic of FIG. 11 returns.

Figure 12:
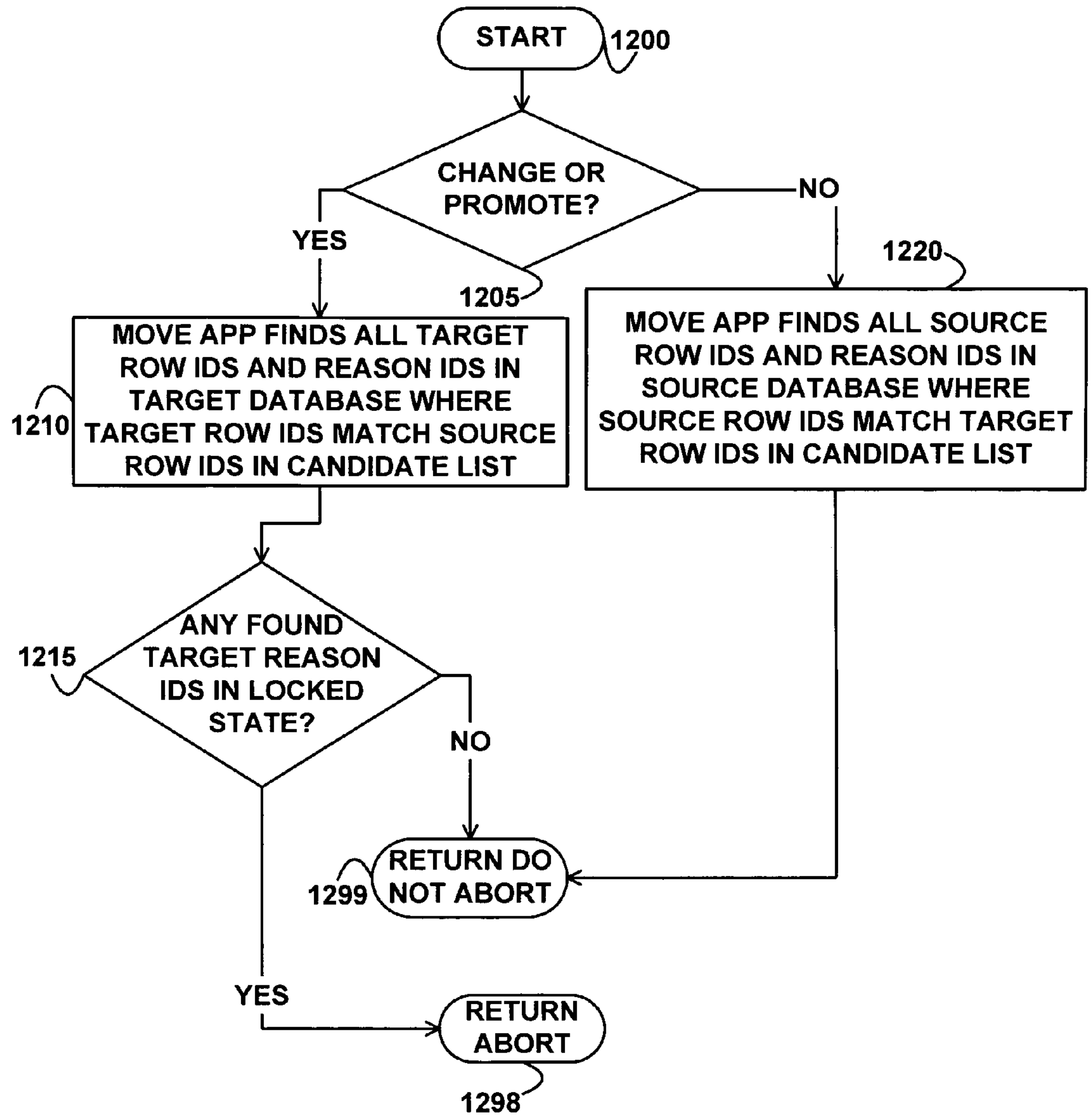
FIG. 12 depicts a flowchart of processing for determining whether to abort a data operation, according to an embodiment of the invention.

FIG. 12 depicts a flowchart of processing for determining whether to abort a data operation, according to an embodiment of the invention. In the case of a promote operation, if a source reason identifier 405 associated with a row identifier 215 in the source database version 152-3 collides with a different target reason identifier 405 associated with the same row identifier 215 in the target database version 152-4, the collision prevents the promote from continuing unless the target reason identifier 405 in the target version of the database 152 is complete. The move application 159 checks the target reason identifier 405 to determine if it is complete in the target database version. The reason identifier 405 is complete if either of the following is true:

a) the reason identifier 405 has a database version indicated in its associated status 430 that is higher in the sequence 450 than the target version of the database 152 and is not in a lock state 455 (the database version indicated in the status 430 is the most recent (highest) database version to accept the changes associated with the reason identifier 405); or b) the target database version 152 is the final database version (e.g., record 496) in the sequence 450 and the target reason identifier 405 has a status 430 of closed.

The reason identifier 405 is in a lock state if the reason identifier 405 has not been promoted high enough in the sequence 450 to be out of the locked versions. In the case of a change operation (an insert, update, or delete) directed to a single target version of the database 152, the logic is the same as promote, but user input is used in lieu of a source database version.

The logic of FIG. 12 begins at block 1200, Control then continues to block 1205 where the move application 159 determines whether the move application 159 is processing a change operation (an insert, update, or delete) directed to a single version of the database 152 or a promote operation directed to a source and target versions of the database 152. If the determination at block 1205 is true, then the move application 159 is processing a change operation (an insert, update, delete) or a promote operation, so control continues to block 1210 where the move application 159 finds all row identifiers 215 and reason identifiers 405 in the target version of the database 152 where the target row identifiers 215 in the target database 152 match the source row identifiers 215 in the candidate list. Control then continues to block 1215 where the move application 159 determines whether any of the found reason identifiers 405 have a locked state by checking the status 430 against the lock 455 to determine whether the reason identifier 405 has been promoted high enough in the sequence 450 to be out of the versions 460 that are locked. If the determination at block 1215 is true, then control continues to block 1298 where a value of abort is returned to the invoker of the logic of FIG. 12.

If the determination at block 1215 is false, then control continues to block 1299 where a value of do not abort is returned to the invoker of the logic of FIG. 12.

If the determination at block 1205 is false, then the move application is processing a demote or undo operation, so control continues to block 1220 where the move application 159 finds all source row identifiers 215 and reason identifiers 405 in the source version of the database 152 where the source row identifiers 215 match the target row identifiers 215 in the candidate list. Control then continues to block 1299 where a return value of do not abort is returned to the invoker of the logic of FIG. 12.

Figure 13:
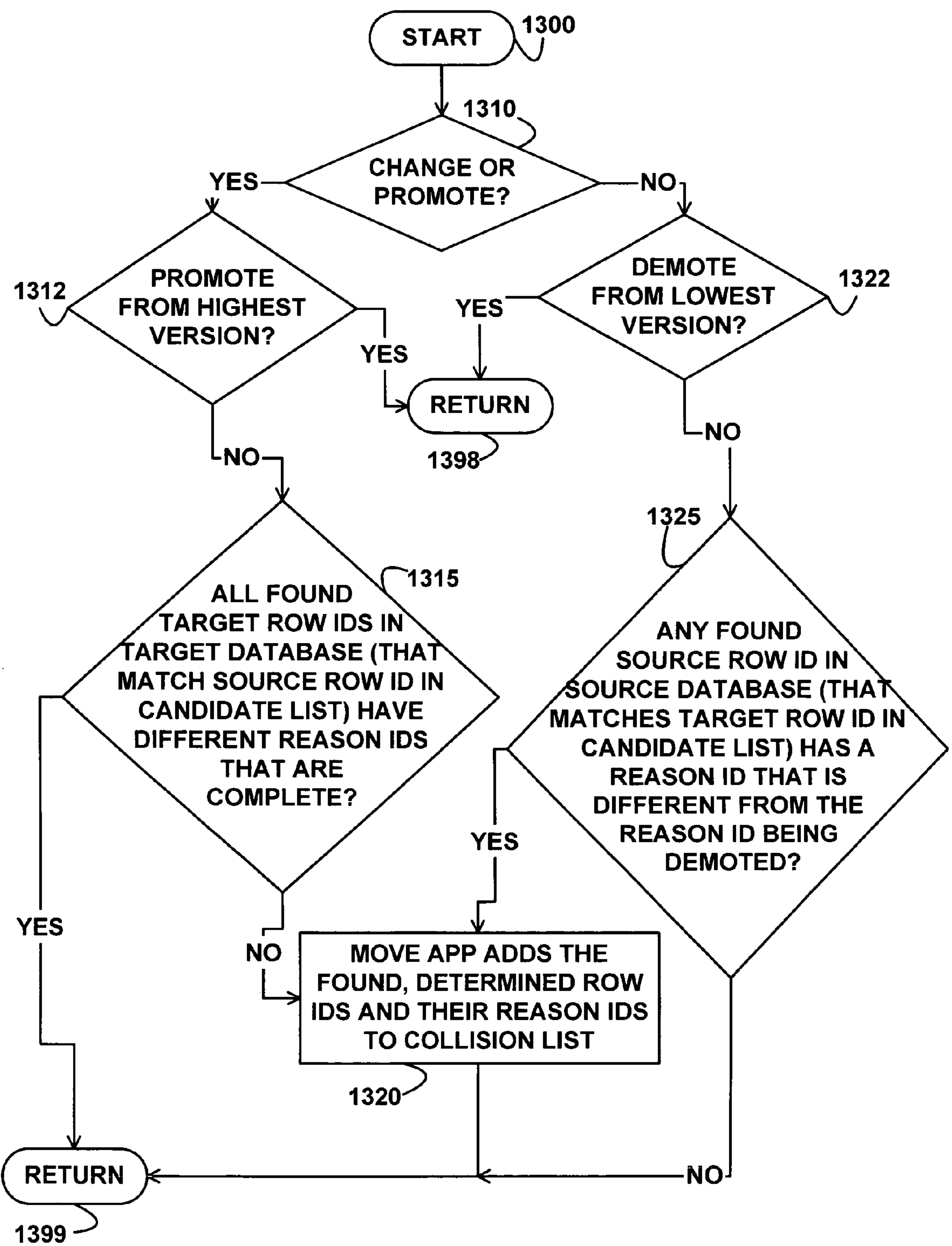
FIG. 13 depicts a flowchart of processing for building collision lists that expand the links list associated with each moved reason, according to an embodiment of the invention.

FIG. 13 depicts a flowchart of processing for building collision lists that expand the links list 445 associated with each moved reason identifier 405, according to an embodiment of the invention. These collisions extend the links lists 445 on the reason identifiers 405 being moved. For a promote operation, the collisions of interest are with reason identifiers 405 in the target database 152 that are not complete and may need to be promoted out of the target before this promotion into the target is performed. In the case of a demote operation, the collisions of interest are with new data updates that have arrived in the source database 152 since these changes were promoted up into the target database 152. In the case of a change operation (insert, update, or delete), collisions of interest are with any incomplete reason identifiers 405 in the target database 152 where the user input behaves as a source database 152. The change operations (insert, update, and delete) are special cases, in that the incomplete reason identifier 405 encountered may be the same reason identifier 405 being entered, which does not grow the links list 445, but is handled by the journaling strategy as further described below with reference to FIG. 14.

The logic of FIG. 13 begins at block 1300. Control then continues to block 1310 where the move application 159 determines whether user change operations (insert, update, or delete) or a promote operation is being processed. If the determination at block 1310 is true, then control continues to block 1312 where the move application 159 determines if the reason identifiers 405 being promoted are already at the highest database version, so that no target collision is possible. If the determination at block 1312 is true, then the reason identifiers 405 being promoted are already at the highest database version, so control continues to block 1398 where the logic of FIG. 13 returns.

If the determination at block 1312 is false, then the reason identifiers 405 being promoted are not in the highest database version, so control continues to block 1315 where the move application 159 determines whether all found target row identifiers 215 in the target database (previously found to match a source row identifier 215 in the candidate list at block 1210 in FIG. 12) have target reason identifiers 405 that are different from the source reason identifier and the different target reason identifiers 405 are complete. If the determination at block 1315 is false, then control continues to block 1320 where the move application 159 adds the row identifiers 215 and their reason identifiers 405 that were found and determined at block 1315 to a collision list. Control then continues to block 1399 where the logic of FIG. 13 returns.

If the determination at block 1315 is true, then control continues to block 1399 where the logic of FIG. 13 returns.

If the determination at block 1310 is false, then control continues to block 1322 where the move application 159 determines whether the reason identifiers 405 are being demoted from the lowest database version which equates to a removal of data. If the determination at block 1322 is false, then the demotion is not from the lowest database version, so control continues to block 1325 where the move application 159 determines whether any found row in the source version of the database 152 (previously found to match a row identifier 215 in the candidate list at block 1220 in FIG. 12) has a reason identifier 405 that is different from the reason identifier 405 being demoted. If the determination at block 1325 is true, then control continues to block 1320, where the move application 159 adds the row identifiers 215 and their reason identifiers 405 that were found and determined at block 1325 to the collision list. Control then continues to block 1399 where the logic of FIG. 13 returns.

If the determination at block 1325 is false, then control continues to block 1399, where the logic of FIG. 13 returns.

If the determination at block 1322 is true, then control continues to block 1398 where the logic of FIG. 13 returns.

Figure 14:
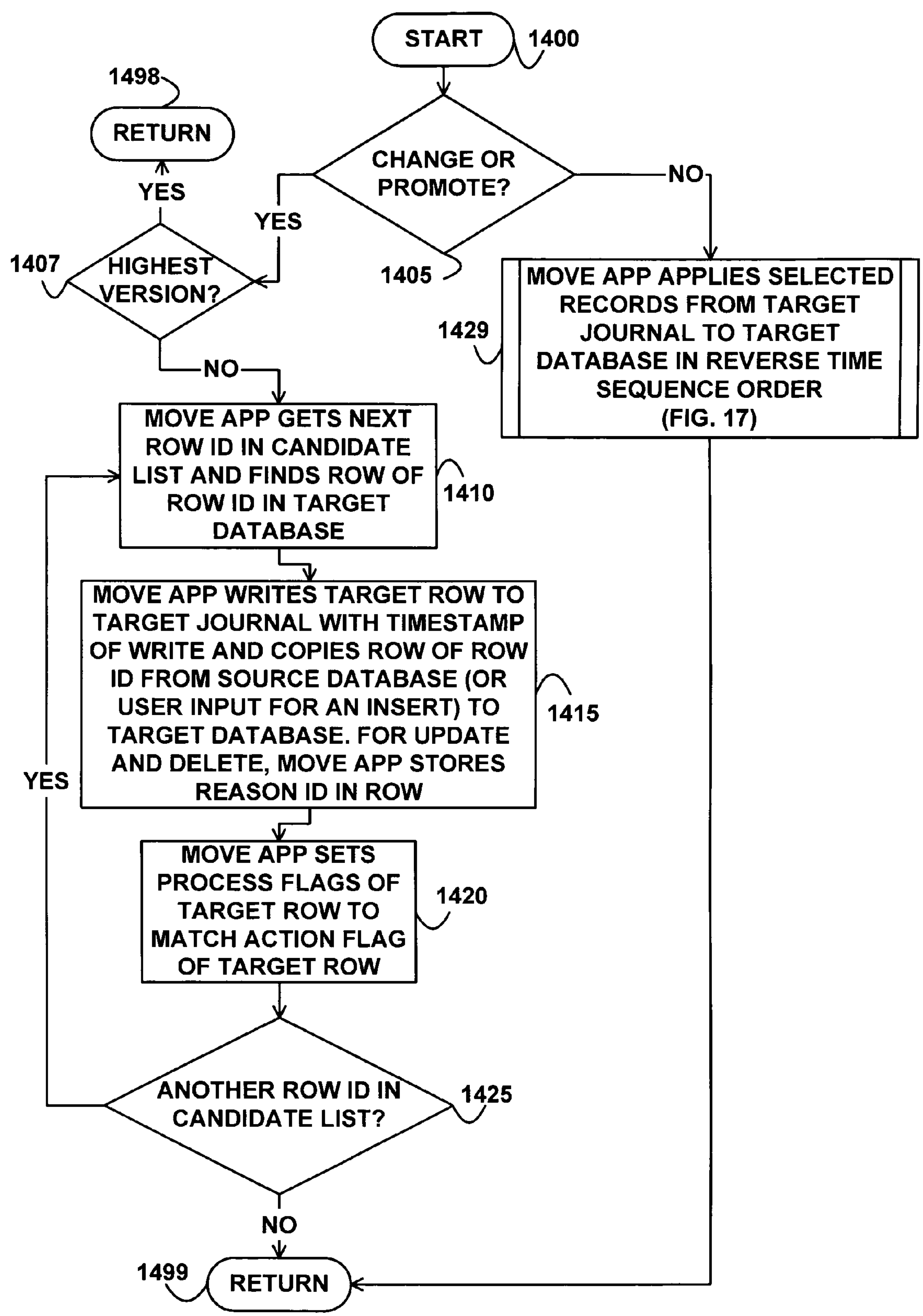
FIG. 14 depicts a flowchart processing for moving data, according to an embodiment of the invention.

FIG. 14 depicts a flowchart processing for moving data, according to an embodiment of the invention. The logic of FIG. 14 is executed for every row identifier 215 in the candidate list. A promote operation modifies the target version of the database 152, and change operations (insert, update, and delete) also modify the target version of the database 152, but user input functions as the source version of the database 152. The change operations (insert, update, and delete) have the special case where the same row identifier 215, the reason identifier 405 are, in an embodiment, entered multiple times before the reason identifier 405 becomes complete in the source version of the database 152. In some embodiments, this may result in additional source journal entries with the same row identifier 215 and reason identifier 405 combination, depending on the journal strategy of the embodiment. The timestamps on the two records differ. In other embodiments, journal recording is suppressed, so long as the row identifier 215 and reason identifier 405 combination is the same as an existing incomplete database record. Demote and restore logic in the embodiments account for repeated updates.

For a demote operation, the first and only occurrence of a row identifier 215 may be demoted out of the target version of the database 152. No journal entry for that row identifier 215 is found, which removes that row identifier 215 from the target version of the database 152. But, dependent applications 153 are notified of the removal, so the process flags 480 are available to the dependent applications 153. Rather than removing the row then, the action field 210 is set to indicate delete, and the process flags 230 are set to match. If this is not the first and only occurrence of this row identifier 215 in the target version of the database 152, then journal entries are restored in the target version of the database 152. But, the journal record is not removed, but is marked (via the ignore field 335) to be ignored by all future demote or restore operations. Demoting out of the first version of the database 152 in the version sequence 450 is a special case. As described in FIG. 13 and the promote description in FIG. 6, some embodiments of the source version of the database 152 may have multiple journal entries for the same reason identifier 405 and row identifier 215 combination. If the reason identifier 405 is the one being demoted, the journal records are ignored. If the reason identifier 405 is the one being restored from the journal 156, then only the record with newest timestamp is restored. When a demote operation does restore journal records, the action fields 315 in the journal 156 are applied to the restored records. In addition, the process flags 230 are set to match the action field 315 of each restored record.

The logic of FIG. 14 begins at block 1400. Control then continues to block 1405 where the move application 159 determines whether the move application 159 is processing a change operation (an insert, update, or delete) or a promote operation. If the determination at block 1405 is true, then the move application 159 is processing change operation (an insert, update, or delete) or a promote operation, so control continues to block 1407 where the move application 159 determines whether the promotion is being done out of the highest database version, which means no higher database version exists in which to write the data.

If the determination at block 1407 is true, then a promotion is being done out of the highest database version, so no higher database version exists in which to write the data, so control continues to block 1498 where the logic of FIG. 14 returns.

If the determination at block 1407 is false, then a promotion out of the highest database version is not being done, so control continues to block 1410 where the move application 159 gets the next row identifier 215 from the candidate list and finds the row of the row identifier 215 in the target version of the database 152. Control then continues to block 1415 where the move application 159 writes the row to the target journal with a timestamp of the write and copies the row of the row identifier 215 from the source version of the database 152 (or from user input in the case of a change operation—an insert, update, or delete) to the target version of the database 152. In the case of an insert, or update operation from user input, the move application 159 stores the reason identifier 215 associated with the change in the row 207. If the operation is a delete, the move application 159 sets the action field 210 and process flags 230 to indicate delete in the row 207 of the row identifier 215 in the target version of the database 152. If the operation is an insert or update, the move application 159 sets the action field 210 and the processes flags 230 to indicate update in the row 207 of the row identifier 215 in the target version of the database 152. Control then continues to block 1420 where the move application 159 sets the process flags 230 of the target row to match the action field 210 of the target row. Control then continues to block 1425 where the move application 159 determines whether another row identifier 215 exists in the candidate list.

If the determination of block 1425 is true, then control returns to block 1410, as previously described above. If the determination at block 1425 is false, then control continues to block 1499 where the logic of FIG. 14 returns.

If the determination at block 1405 is false, then the move application 159 is processing a demote operation or an undo operation, so control continues to block 1429 where the move application 159 applies selected records in the target journal to the target database version in reverse time sequence order (the records are applied to the database in reverse order from the order that the records were stored in the journal), as further described below with reference to FIG. 17. Control then continues to block 1499 where the logic of FIG. 14 returns.

Figure 15:
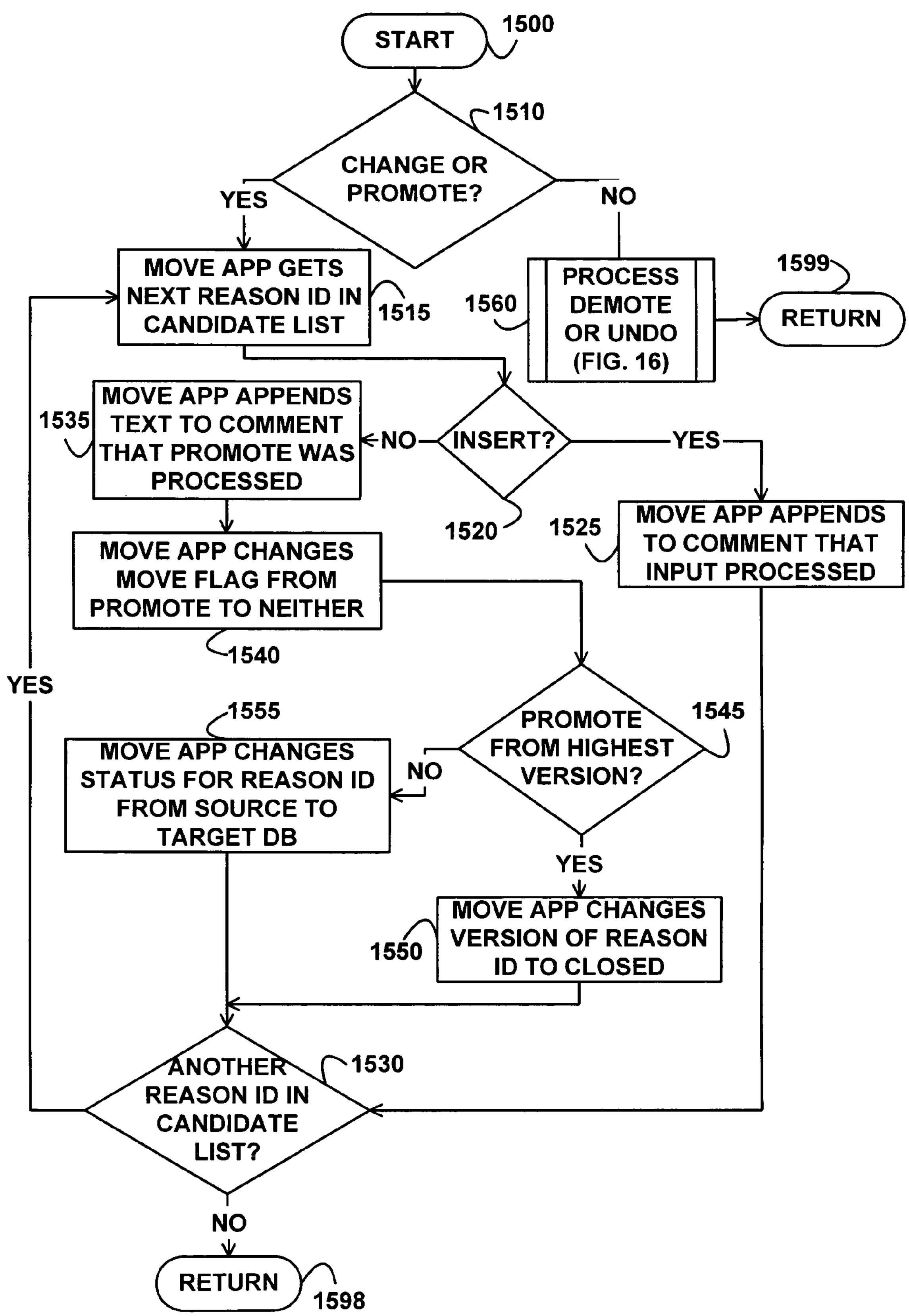
FIG. 15 depicts a flowchart of processing for updating reason data following completion of a data move, according to an embodiment of the invention.

FIG. 15 depicts a flowchart of processing for updating the reason data 154 following completion of a data move, according to an embodiment of the invention. For every reason identifier 405, the comment 435 is modified with some meaningful text indicating that the data movement was completed. In the case, of promote and demote, the move field 440 is toggled back to the default state since the data move was accomplished. The status field 430 is modified to communicate the database version containing the related data or some other control field such as open, closed, or removed. A change operation (an insert, update, or delete) does not utilize or modify the move field 440. In some embodiments, however, a change operation (an insert, update, or delete) alters the status 430 of the reason identifier 405 from an open status to a status that indicates the source version the first time that reason identifier 405 is used on a change operation (an insert, update, or delete). In other embodiments, the change operation (an insert, update, or delete) might not be allowed until the reason application 134 alters the status of the reason identifier 405 from open to source.

The logic of FIG. 15 begins at block 1500. Control then continues to block 1510 where the move application 159 determines whether the move application 159 is processing change operation (an insert, update, or delete) or a promote operation. If the determination at block 1510 is true, then the move application 159 is processing a change operation (an insert, update or delete) or a promote operation, so control continues to block 1515 where the move application 159 gets the next reason identifier 405 in the candidate list. Control then continues to block 1520 where the move application 159 determines whether the move application 159 is processing a change operation (an insert, update, or delete). If the determination at block 1520 is true, then control continues to block 1525 where the move application 159 appends to the comment 435 an indication that the insert was processed. Control then continues to block 1530 where the move application 159 determines whether another reason identifier 405 exists in the candidate list.

If the determination at block 1530 is true, then control returns to block 1515, as previously described above.

If the determination at block 1530 is false, then control continues to block 1598 where the logic of FIG. 15 returns.

If the determination at block 1520 is false, then control continues to block 1535 where the move application 159 appends text to the comment 435 indicating that the promote was processed. Control then continues to block 1540 where the move application 159 changes the move field 440 from indicating a promote to indicating neither a promote nor a demote. Control then continues to block 1545 where the move application 159 determines whether the promote is from the highest database version by comparing the version in the status 430 to the sequence 450 and the version 460.

If the determination at block 1545 is true, then the promote is from the highest database version, so control continues to block 1550 where the move application 159 changes the version of the reason identifier 405 to closed via the status 430. Control then continues to block 1530, as previously described above.

If the determination at block 1545 is false, then the promote is not from the highest database version, so control continues to block 1555 where the move application 159 changes the status 430 for the reason identifier 405 from indicating the source database version to indicating the target database version. Control then continues to block 1530, as previously described above.

If the determination at block 1510 is false, then the move application is processing a demote or undo operation, so control continues to block 1560 where the move application 159 updates the reason data 154 for demote and undo operations, as further described below with reference to FIG. 16. Control then continues to block 1599 where the logic of FIG. 15 returns.

Figure 16:
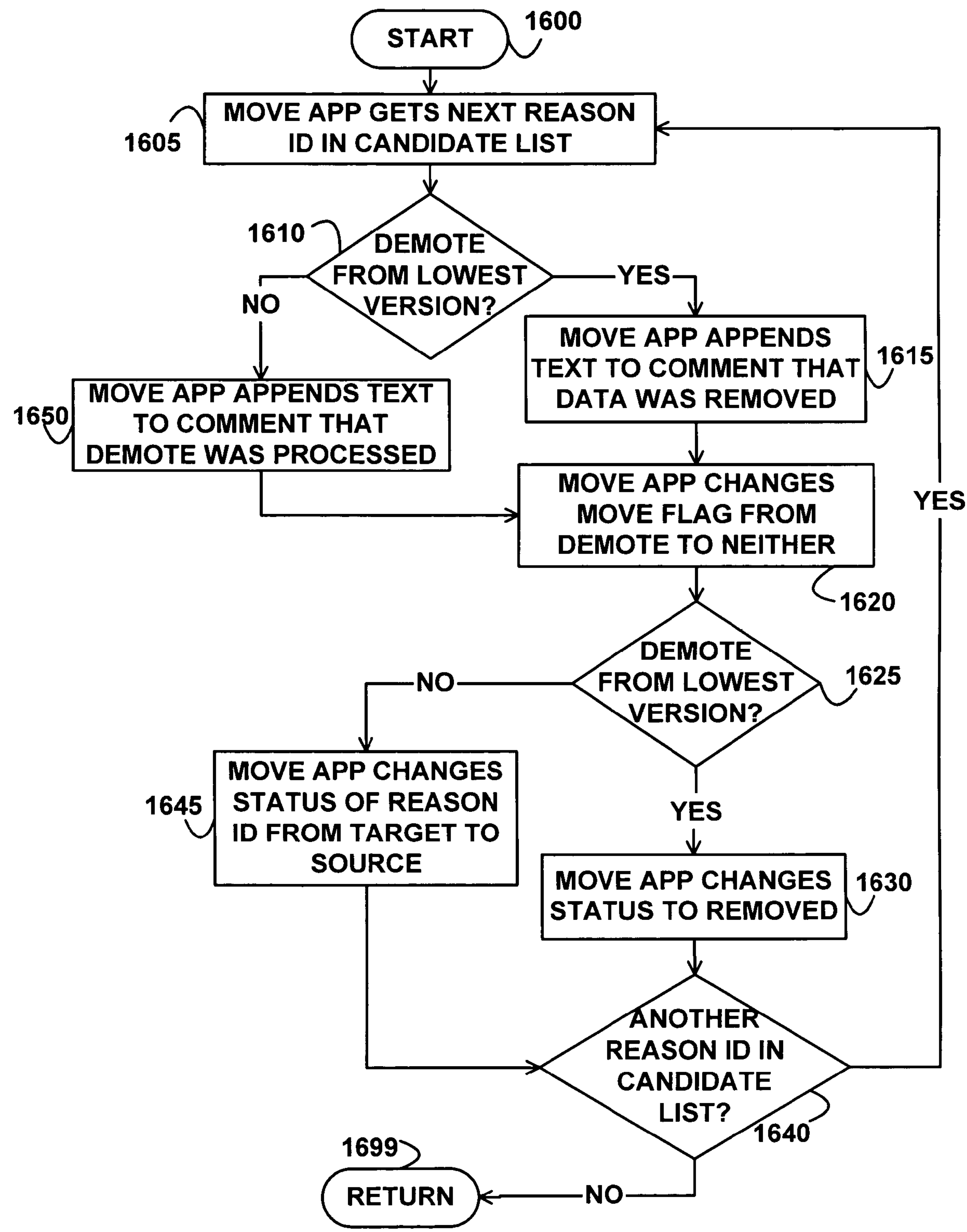
FIG. 16 depicts a flowchart of further processing for updating reason data following completion of a data move, according to an embodiment of the invention.

FIG. 16 depicts a flowchart of further processing for updating the reason data 154 following completion of a data move, according to an embodiment of the invention. Control begins at block 1600. Control then continues to block 1605 where the move application 159 retrieves the next reason identifier 405 from the candidate list. Control then continues to block 1610 where the move application 159 determines whether the demote operation is from the lowest database version.

If the determination at block 1610 is true, then control continues to block 1615 where the move application 159 appends text to the comment 435 indicating that data was removed. Control then continues to block 1620 where the move application 159 changes the move field 440 from indicating a demote to indicating neither promote nor demote. Control then continues to block 1625 where the move application 159 determines whether the demote is from the lowest database version.

If the determination at block 1625 is true, then control continues to block 1630 where the move application 159 changes the status to removed. Control then continues to block 1640 where the move application 159 determines whether another reason identifier 405 exists in the candidate list.

If the determination at block 1640 is true, the control returns to block 1605, as previously described above.

If the determination at block 1640 is false, then control continues to block 1699 where the logic of FIG. 16 returns.

If the determination at block 1625 is false, then control continues to block 1645 where the move application 1645 changes the status of the reason identifier 405 from target to source.

If the determination at block 1610 is false, then control continues to block 1650 where the move application 159 appends text to the comment 435 indicating that the demote was processed. Control then continues to block 1620, as previously described above.

Figure 17:
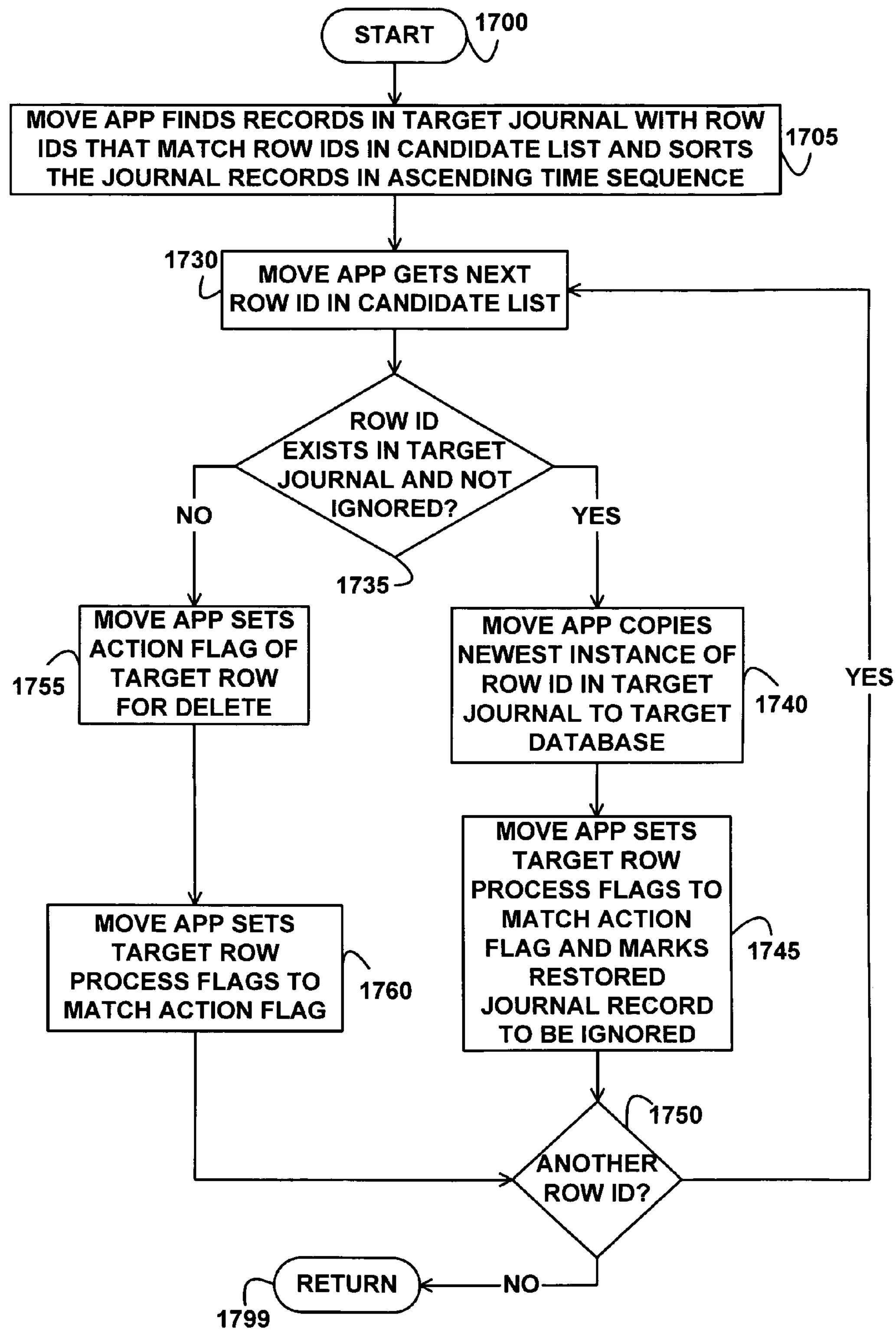
FIG. 17 depicts a flowchart of processing for applying journal records to a target database version in reverse time sequence order, according to an embodiment of the invention.

FIG. 17 depicts a flowchart of processing for applying journal records to a target database version in reverse time sequence order, according to an embodiment of the invention. Control begins at block 1700. Control then continues to block 1705 where the move application 159 finds the records in the target version of the journal 156 that have row identifiers 320 that match the row identifiers in the candidate list. The move application 159 sorts the found journal records in an ascending time sequence (from oldest to newest) based on the timestamp field 340. Control then continues to block 1730 where the move application 159 retrieves the next row identifier 215 in the candidate list. Control then continues to block 1735 where the move application 159 determines whether the row identifier 215 exists in the target journal 156 and is not marked (via the ignore field 335) to ignore.

If the determination at block 1735 is true, then control continues to block 1740 where the move application 159 copies the newest instance (the most recent instance in the journal 156 based on the timestamp 340) of the row identifier 215 in the target journal 156 to the target database 152. Control then continues to block 1745 where the move application 159 sets the target row process flags 230 to match the action field 315 and marks the restored journal record to be ignored (via the ignore field 335). Control then continues to block 1750 where the move application 159 determines whether another row identifier 215 exists in the candidate list. If the determination at block 1750 is true, then control returns to block 1730, as previously described above.

If the determination at block 1750 is false, then control continues to block 1799 where the logic of FIG. 17 returns.

If the determination at block 1735 is false, then control continues to block 1755 where the move application 159 sets the action field 210 of the target row to delete. Control then continues to block 1760 where the move application 159 sets the target row process flags 230 to match the action field 315. Control then continues to block 1750, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:

storing a first reason identifier in a first plurality of rows in a source version of a database, wherein the first reason identifier identifies a first change to the first plurality of rows in the source version of the database, wherein the first plurality of rows comprise a first plurality of row identifiers;

in response to a promote operation that specifies the first reason identifier, the source version, and a target version of the database, determining whether a second plurality of rows exists in the target version that comprises a second plurality of row identifiers, whether the second plurality of row identifiers and the first plurality of row identifiers are identical, and whether a second reason identifier is complete and is different from the first reason identifier, wherein the second reason identifier identifies a second change to the second plurality of rows in the target version of the database, wherein the second reason identifier is complete when a most-recent version of the database to accept a change associated with the second reason identifier is higher in a sequence of a plurality of database versions than the target database version, wherein the sequence comprises a time order of the plurality of versions of the database, wherein the versions of the database that are higher in the sequence contain data that was added at an earlier time than the versions of the database that are lower in the sequence, wherein the promote operation requests moving the change upwards in the sequence;

when the second plurality of rows exists in the target version that comprises the second plurality of row identifiers and the second reason identifier, the second plurality of row identifiers and the first plurality of row identifiers are identical, and the second reason identifier is complete and is different from the first reason identifier, copying the first plurality of rows to the second plurality of rows;

when the second plurality of rows exists in the target version that comprises the second plurality of row identifiers that are identical to the first plurality of row identifiers and the second reason identifier is not complete and is different from the first reason identifier, linking the first reason identifier and the second reason identifier, and in response to a command that specifies the first reason identifier, performing the command against the first reason identifier and the second reason identifier that is linked to the first reason identifier; and when the second plurality of row identifiers are not identical to the first plurality of row identifiers, copying the first plurality of rows to the target version and refraining from linking the first reason identifier and the second reason identifier.

2. The method of claim 1, wherein the determining whether the second reason identifier is complete further comprises:

determining whether the target database version is a final version in the sequence of the plurality of database versions.

3. The method of claim 1, further comprising:

storing the first reason identifier in a plurality of records in a journal, wherein the records comprise content of the first plurality of rows that existed in the database prior to the first change.

4. The method of claim 3, further comprising:

in response to an undo command, finding the most-recent records in the journal that are associated with the first reason identifier and moving the content of the records to the source version of the database in reverse time sequence order.

5. A method for configuring a computer, comprising:

configuring the computer to store a first reason identifier in a first plurality of rows in a source version of a database, wherein the first reason identifier identifies a first change to the first plurality of rows in the source version of the database, wherein the first plurality of rows comprise a first plurality of row identifiers;

configuring the computer to, in response to a promote operation that specifies the first reason identifier, the source version, and a target version of the database, determine whether a second plurality of rows exists in the target version that comprises a second plurality of row identifiers, whether the second plurality of row identifiers and the first plurality of row identifiers are identical, and whether a second reason identifier is complete and is different from the first reason identifier, wherein the second reason identifier identifies a second change to the second plurality of rows in the target version of the database, wherein the configuring the computer to determine further comprises configuring the computer to determine whether a most-recent version of the database to accept a change associated with the second reason identifier is higher in a sequence of a plurality of database versions than the target database version, wherein the sequence comprises a time order of the plurality of versions of the database, wherein the versions of the database that are higher in the sequence contain data that was added at an earlier time than the versions of the database that are lower in the sequence, wherein the promote operation requests moving the change upwards in the sequence;

configuring the computer to copy the first plurality of rows to the second plurality of rows when the second plurality of rows exists in the target version that comprises the second plurality of row identifiers and the second reason identifier, the second plurality of row identifiers and the first plurality of row identifiers are identical, and the reason identifier is complete and is different from the first reason identifier, wherein the second reason identifier is complete when the most-recent version of the database to accept the change associated with the second reason identifier is higher in the sequence of the plurality of database versions than the target database version;

configuring the computer to link the first reason identifier and the second reason identifier when the second plurality of rows exists in the target version that comprises the second plurality of row identifiers that are identical to the first plurality of row identifiers and the second reason identifier that is not complete and is different from the first reason identifier, and in response to a command that specifies the first reason identifier, configuring the computer to perform the command against the first reason identifier and the second reason identifier that is linked to the first reason identifier; and configuring the computer to copy the first plurality of rows to the target version and refrain from linking the first reason identifier and the second reason identifier when the second plurality of row identifiers are not identical to the first plurality of row identifiers.

6. The method of claim 5, further comprising:

configuring the computer to store the first reason identifier in a plurality of records in a journal, wherein the records comprise content of the first plurality of rows that existed in the database prior to the first change; and configuring the computer to find the most-recent records in the journal that are associated with the first reason identifier and move the content of the records to the source version of the database in reverse time sequence order in response to an undo command.

* * * * *